US008407112B2

(12) United States Patent
Walter

(10) Patent No.: US 8,407,112 B2
(45) Date of Patent: Mar. 26, 2013

(54) TRANSACTION AUTHORISATION SYSTEM AND METHOD

(75) Inventor: Greg Walter, Capalaba (AU)

(73) Assignee: Qpay Holdings Limited, Capalaba (AU)

( * ) Notice: Subject to any disclaimer, the term of this patent is extended or adjusted under 35 U.S.C. 154(b) by 957 days.

(21) Appl. No.: 12/334,957

(22) Filed: Dec. 15, 2008

(65) Prior Publication Data

US 2009/0234760 A1   Sep. 17, 2009

Related U.S. Application Data

(63) Continuation-in-part of application No. 12/297,591, filed as application No. PCT/AU2007/001076 on Aug. 1, 2007.

(51) Int. Cl.
*G07B 17/00* (2006.01)
*G07F 19/00* (2006.01)
(52) U.S. Cl. ........................................................ 705/30
(58) Field of Classification Search .................... 705/30, 705/1.1
See application file for complete search history.

(56) References Cited

U.S. PATENT DOCUMENTS

| | | | |
|---|---|---|---|
| 6,934,856 B1 | 8/2005 | Provitola | 713/201 |
| 6,934,858 B2* | 8/2005 | Woodhill | 726/5 |
| 7,383,752 B2 | 6/2008 | Suzuki | 74/512 |
| 7,606,560 B2 | 10/2009 | Labrou et al. | |
| 7,685,037 B2* | 3/2010 | Reiners et al. | 705/35 |
| 7,983,979 B2* | 7/2011 | Holland, IV | 705/37 |
| 2003/0163739 A1* | 8/2003 | Armington et al. | 713/202 |
| 2004/0078238 A1 | 4/2004 | Thomas et al. | 705/3 |
| 2005/0038738 A1* | 2/2005 | Peck et al. | 705/40 |
| 2005/0043964 A1 | 2/2005 | Thielscher et al. | 705/2 |
| 2006/0021003 A1* | 1/2006 | Fisher et al. | 726/1 |

FOREIGN PATENT DOCUMENTS

| | | |
|---|---|---|
| AU | 2003231813 | 12/2003 |
| GB | 2398159 | 8/2004 |
| GB | 2399209 | 9/2004 |
| GB | 2438284 | 11/2007 |
| JP | 02-027463 | 1/1990 |
| WO | 01/42883 | 6/2001 |

OTHER PUBLICATIONS

Steve Bills. "Different Approaches to Corporate Authentication." American Banker Oct. 14, 2005,Accounting & Tax Periodicals, ProQuest. Web. Jul. 25, 2012.*
SourceForge.net Class Definition of "RandomGUID" Nov. 5, 2002 (4 pages).

* cited by examiner

*Primary Examiner* — Seye Iwarere
(74) *Attorney, Agent, or Firm* — Volpe and Koenig, P.C.

(57) ABSTRACT

A transaction authorization system allows a customer to authorize transactions relating to at least one account associated with an institution. Data storage means enable access to customer identification data, a customer's remote communication device (RCD), and security identifier data associating the account with the identification data. Communication means receive an authorization request, referenced to the security identifier data, relating to the transaction and enable communication with the customer via the RCD to authorize a transaction or to indicate that a transaction is fraudulent. Data processing means identify the customer and RCD using the identification data and determine if the transaction is authorized, or has been indicated as being fraudulent, and if the transaction is fraudulent, to determine the type of fraud. The communication means provide an indication, referenced to the security identifier data, to the institution of whether the transaction is authorized.

18 Claims, 25 Drawing Sheets

TRANSACTION AUTHORISATION SYSTEM AND METHOD

CROSS REFERENCE TO RELATED APPLICATIONS

This application is a continuation-in-part of U.S. application Ser. No. 12/297,591, filed Oct. 17, 2008, which is a U.S. national stage filing of PCT/AU2007/001076, filed Aug. 1, 2007, and claims priority to Australian Application No. 2008905862, filed Nov. 13, 2008, which are incorporated by reference as if fully set forth herein.

FIELD OF INVENTION

The present invention relates to a system and method for the authorisation of transactions such as credit card purchases, bank transfers, and share purchases, particularly in environments where remote payments for goods and services are made.

BACKGROUND

Security of financial and other types of transactions is of great importance due to the relatively recent growth of threats such as phishing and pharming which are intended to fraudulently acquire sensitive information, such as passwords, pin numbers and credit card details, by masquerading as a trustworthy person or business in an electronic communication. Once such details are fraudulently acquired they are utilised to make financial payments or to misappropriate funds from financial accounts. The account holder is often without any knowledge of these fraudulent transactions until after they have been concluded and it is too late to intervene. It is desirable, therefore, to seek authorisation of transactions from a customer before transactions are concluded by the financial institution.

In current systems used to authorise financial transactions, it is difficult and often impossible to obtain a firm guarantee that the person initiating the transaction is the account holder and is authorised to conclude the transaction. For example, when a merchant swipes a customer's credit card, the credit card terminal connects to the merchant's acquirer, or credit card processor, which verifies that the customer's account is valid and that sufficient funds are available to cover the transaction's cost. However, this process does not provide any form of verification that the individual making the transaction is indeed authorised to do so.

Although, a merchant may compare a signature on the credit card to the signature of the customer, such methods of verifying whether or not the transaction is fraudulent are far from foolproof. Furthermore, the account holder and credit card provider are relying on the merchant to deny transactions that appear to be fraudulent and unauthorised.

This issue is particularly pronounced with transactions conducted in the online environment or over the telephone, where the merchant is unable to verify the customer's signature and therefore determine whether or not the transaction is fraudulent.

One method of overcoming such issues is to require the purchaser to provide a Card Verification Value Code (CVV), which is not part of the card number itself, and is also known as CVV2, CVC2, and CID. The CVV is an authentication procedure established by credit card companies to reduce fraud for internet and telephone transactions. It consists of requiring a card holder to provide the CVV number at transaction time to verify that the card is on hand. While the CVV code helps ascertain that the customer placing the order actually possesses the credit/debit card and that the card account is legitimate, this authentication procedure is ineffective when the card itself has been misappropriated or in scenarios where there has been unauthorised access to the financial records of the account holder.

Similarly, in current systems where the customer is required to provide a password or pin number before a transaction is authorised, unauthorised access to the account holder's records is likely to provide the information required to fraudulently authorise transactions.

Accordingly, it is an object of the invention to provide a system for authorising transactions which seeks to alleviate the problems of prior art systems.

It will be clearly understood that, if a prior art publication or systems are referred to herein; this reference does not constitute an admission that the publication or system forms part of the common general knowledge in the art in Australia or in any other country.

SUMMARY

Broadly, the invention allows transactions, such as credit card payments, online banking funds transfers, or others, to be securely authorised by a customer, preferably before the transaction is concluded by the relevant institution. In one form, such authorisation occurs when the customer, prompted by an interactive voice response (IVR) system for example, provides one or more unique identifiers to validate his or her identity and authenticate the transaction. Alternatively, the customer may indicate that the transaction is fraudulent which is in turn communicated to the relevant institution so that appropriate actions may be taken. The information maintained by the authorisation system is separated from the account and customer records of the financial institution in order to maximise security in the authorisation process and mitigate the risk of fraudulent authentication of transactions that may arise as a result of unauthorised access to the stored information.

In one aspect, the invention provides a transaction authorisation system for allowing a customer to authorise transactions relating to at least one customer account associated with an institution, the system including:
(a) data storage means for enabling access to
(b) identification data associated with the customer;
identification data associated with a remote communication device (RCD) of the customer; and
(c) security identifier data associating the at least one customer account with either one or both of (a) and (b);
a first communication means for enabling communication with the customer via the RCD to authorise a transaction on the at least one customer account or to indicate a transaction on the at least one customer account is fraudulent;
a data processing architecture including data processing means to identify the customer using (a), identify the RCD using (b) and determine if the transaction is authorised by the customer or if the transaction has been indicated as being fraudulent by the customer, and if said transaction is fraudulent, to determine the type of fraud associated with the fraudulent transaction; and
a second communication means for receiving an authorisation request in relation to the transaction and providing an indication to the institution of whether or not the transaction is authorised by the customer,
wherein the authorisation request received and the indication provided to the institution are referenced to the security identifier data.

In another aspect, the invention provides a method for allowing a customer to authorise transactions relating to at least one customer account held at an institution, the method including the steps of:

(a) an authorisation server receiving an authorisation request from the institution in relation to a transaction on the at least one customer account;

(b) the authorisation server communicating with the customer via a remote communication device (RCD) of the customer to authorise the transaction;

(c) the authorisation server identifying the customer using identification data associated with the customer to which the authorisation server has access;

(d) the authorisation server identifying the RCD using stored identification data associated with the RCD to which the authorisation server has access;

(e) the authorisation server determining if the transaction is authorised by the customer or if the transaction is indicated as fraudulent by the customer, and if said transaction is fraudulent, determining the type of fraud associated with the fraudulent transaction;

(f) the authorisation server communicating an indication to the institution of whether or not the transaction is authorised by the customer, wherein the authorisation request received by the authorisation server and the indication provided to the institution are referenced by the institution and the authentication server to security identifier data for associating the at least one customer account with one or both of the stored identification data associated with the customer and the stored identification data associated with the RCD.

In yet another aspect, the present invention provides a transaction authorisation system for allowing a customer to authorise transactions relating to at least one customer account associated with an institution, the system including:

data storage means for enabling access to:

(d) identification data associated with the customer;

(e) identification data associated with a remote communication device (RCD) of the customer; and (f) security identifier data associating the at least one customer account with either one or both of (a) and (b);

a first communication means for enabling communication with the customer via the RCD to authorise a transaction on the at least one customer account, the first communication means including an interactive voice response (IVR) system arranged to provide the customer with a plurality of alternative feedback options;

a data processing architecture including data processing means to identify the customer using (a), identify the RCD using (b) and determine if the transaction is authorised by the customer; and a second communication means for receiving an authorisation request in relation to the transaction and providing an indication to the institution of whether or not the transaction is authorised by the customer, wherein the authorisation request received and the indication provided to the institution are referenced to the security identifier data.

In yet a further aspect, the invention provides a method for allowing a customer to authorise transactions relating to at least one customer account held at an institution, the method including the steps of:

(a) an authorisation server receiving an authorisation request from the institution in relation to a transaction on the at least one customer account;

(b) the authorisation server communicating with the customer via a remote communication device (RCD) of the customer to authorise the transaction, wherein the communication includes use of an interactive voice response (IVR) system which provides the customer with a plurality of alternative feedback options;

(c) the authorisation server identifying the customer using identification data associated with the customer to which the authorisation server has access;

(d) the authorisation server identifying the RCD using stored identification data associated with the RCD to which the authorisation server has access;

(e) the authorisation server determining if the transaction is authorised by the customer;

(f) the authorisation server communicating an indication to the institution of whether or not the transaction is authorised by the customer, wherein the authorisation request received by the authorisation server and the indication provided to the institution are referenced by the institution and the authentication server to security identifier data for associating the at least one customer account with one or both of the stored identification data associated with the customer and the stored identification data associated with the RCD.

In one form, the invention resides in a remote payment system allowing a customer to transact payments for goods and services remotely in a secure manner with members of the system, the system including:

(i) data storage means containing updateable data relating to each of a plurality of customers and each of a plurality of members of the system, wherein each customer has at least one associated registry profile with a related monetary reservoir;

(ii) a data processing architecture including data processing means and a clearing house system for settling indebtedness between members and customers of the system;

(iii) communications means associated with the data processing architecture for communicating with the customers via a remote communications device (RCD) of each of the customers;

the system being arranged for one or more of said customers to transact payments for goods or services pursuant to a payment request made by one or more of the members, the payment request triggering a communications event from the communications means to the RCD of the relevant customer for the purpose of validating the customer's identity and access to the respective registry profile, and the system being further arranged so as to validate the customer's identity and once such has taken place, allowing the customer to transact payments provided a positive balance remains in the monetary reservoir.

In a second form, the invention resides in a remote payment method allowing a customer to transact payments for goods and services remotely in a secure manner with members of a remote payment system, the system including:

(i) data storage means for containing updateable data relating to each of a plurality of customers, and each of a plurality of members of the system, wherein each customer has at least one associated registry profile with a related monetary reservoir;

(ii) data processing architecture including data processing means and a clearing house system for settling indebtedness between members and customers of the system;

(iii) communications means associated with the data processing architecture for communicating with the customers via a remote communications device (RCD) of each of the customers, wherein the customer uses the system to transact payments for goods or services pursuant to a payment request made by one or more the members, the payment request triggering a communications event from the at least one communications means to the RCD of the relevant customer for the purpose of validating the customer's identity and access to the respective registry profile, and once the customer's identity has been validated, the customer being allowed to transact payments provided a positive balance remains in the monetary reservoir.

The term transaction is intended to broadly cover various actions which may be performed on an account, such as payment requests, order requests, share transfers, funds transfers, proof of identity requests, requests to release information, or a combination of these actions. Such actions may also be initiated in variety of ways, for example, a payment request may originate from a credit card transaction at a physical store, a purchase on an ecommerce website (click-to-buy), or a remote payment system which uses a customer's mobile phone to pay for goods and services such as text-to-buy or talk-to-buy systems.

The term customer is intended to be understood to broadly include not just customers of financial institutions, but also, any persons having an account with an institution for example, employees, suppliers, or citizens relating to a government agency.

The invention advantageously provides the customer with an opportunity, preferably using at least one means of communication that is "off line" and therefore less susceptible to security breaches, to authorise or flag a transaction before it is approved by the bank or credit card issuer, and funds are transferred to the merchant.

Although it is usually desirable for the authorisation of a transaction to take place close to the end of the transaction process, it is to be appreciated that the authorisation of the transaction may take place at any point during the transaction process. For example, it is envisioned that the authorisation of the transaction may occur even before a request for funds is made by the merchant. This is particularly advantageous in online environments where processing times of transactions are usually required to fall within specified constraints.

It is also envisioned that the invention can be applied in situations where a pre-approval authorisation is provided without first contacting the customer, allowing the transaction to proceed without delay. However, if the customer, once contacted in regards to the transaction, fails to authorise the transaction or flags the transaction as being unauthorised, the pre-authorisation is immediately revoked and if funds have already been transferred, they are also retrieved.

Use of a secure identifier such as a PIN which is memorised by the customer or biometric data (e.g., voice print, finger print, retina scan, behaviometric etc.) means that the transaction is only authorised once the identity of the customer, using information which is not normally available to a fraudulent person, is verified. A further advantage is provided by the fact that the customer's verification and contact details in the system are maintained in a separate data store to the customer's bank details with only a single security identifier (known only to the bank's system and the authorisation system) linking the separated data stores. Such a setup provides increased security as unauthorised access to any one of the data stores on its own will not provide information adequate to circumvent the authorisation system and conduct fraudulent transactions.

The system of the present invention is particularly useful for customers who do not have access to conventional banking facilities or those who simply want a more convenient and secure manner in which to authorise payments for goods and services, or other transactions, in a secure manner. Fees may be levied by the system administrator for transactions effected using the system, and which may be flat fees or percentages of transaction amounts, or a combination thereof.

The remote communications device (RCD) may be any device capable of communication and is not limited to one-way or two-way communications devices. Examples of preferred forms of RCDs include the customer's fixed or mobile telephone, a personal computing device (whether mobile or fixed) or a facsimile or pager of the customer. All of these devices and others which are not listed but are included as a RCD can generally have a software component.

Any RCD(s) which a customer wishes to use with the system should be registered with the system and accordingly, information identifying the RCD (which is normally unique to that RCD) is recorded for use in the identification process.

The customer may designate which RCD or group of RCDs they wish to use for contact with the system and if a group is designated, for example, for multifactor authentication (discussed below), the customer may additionally designate which RCD is to perform in which manner within the multifactor identification process.

Authorisation for a particular transaction will be dependant upon the validation of the customer's identity which will typically be required before authorisation for the transaction is given. The system sets the verification of the customer's identity as a pre-authorisation condition, and the transaction will preferably be blocked before authorisation if the condition is not satisfied. In other words, the transaction will be declined if the identity of the customer cannot be established by the system. An alert may be sent to the system administrator, notifying the system administrator of the failure to verify the identity of the customer, allowing steps to refuse or block the transaction request to be taken.

Usually, authorisation for transactions is generally given by financial institutions dependant upon the satisfaction of the identification parameter and/or other parameters as long as that the transaction amount does not exceed the credit limit and/or the membership is still valid and the like. The system of the present invention may operate as a further part of this authorisation process. The system may be associated with the data feed used during the authorisation process and the satisfaction or contravention of the identification criteria communicated to the system administrator may be a further parameter which may be required before authorisation is given by the financial institution.

In the context of a common credit card transaction, for example, the customer, who is typically the owner of the card, uses the card to make a purchase from a merchant, which is the business accepting credit card payments for products or services sold to the customer. The merchant generally collects the card information, by swiping the card through a reader or similar machine if it is a physical store, or otherwise via the Internet or telephone.

As the merchant will wish to verify, for example, that the card is valid and the credit card customer has sufficient credit to cover the purchase, electronic verification is conducted using a credit card payment terminal, Point of Sale (POS) system or like with a communications link to the merchant's acquiring bank. Data from the card is obtained from a magnetic stripe or chip on the card, a chip on a customer device, or is provided by the customer in an online form or verbally over the telephone.

The acquirer, i.e., the financial institution or other organisation that provides card processing services to the merchant, contacts the card issuer via the card association, i.e., a network such as VISA or MasterCard (and others) that acts as a gateway between the acquirer and issuer for authorising and funding transactions.

The issuer, preferably before authorising and funding the transaction, forwards the request to the system of the present invention for authorisation from the customer.

It is to be appreciated, that such customer authorisation requests are not limited to payment systems involving credit cards, but may be equally applied to financial transaction systems involving debit cards, funds transfers between accounts, share purchases, etc., or, for example, when accessing secure systems across a network and a request for the purpose of authorising the remote system access is issued.

A complete remote payment system in which the customer authorisation request is received and processed directly by the system is also envisioned and described in detail below.

Importantly, regardless of the manner in which the contact for payment is made using the system, the substantive portions of the authentication and validation processes will preferably take place beginning with the system contacting the designated RCD of the customer and preferably using an interactive voice response (IVR) system or similar system to verify the identity of the customer. The authentication process may include one or more factors and methods of contact with the customer and authentication including, but not limited to, IVR systems, biometric information relating to the customer such as voice recognition in particular, code entry from one or more sources along one or more communications channels, generated codes, Radio Frequency ID (RFID), one time only codes or the like.

Two-factor authentication may be used in an attempt to overcome newer forms of fraud, as has using two different communications paths. For example, the system may communicate a challenge to the customer cell phone via SMS and expect a specified reply. If it is assumed that all of the bank's customers have cell phones then this results in a two-factor authentication process without extra hardware. Multifactor authentication will typically involve the use of more than one communications channel or sessions wherein a challenge can be issued on a first channel and, the customer response or second authentication piece is communicated over a different communications channel or different communications session than the first, requiring the customer to have access to both in order to comply, making eavesdropping much more difficult. The communications channels will typically be directed to a particular RCD which itself will normally have unique identifying information which will also be required to match or correlate the customer verification information stored by the system before authentication is granted.

The system uses the authentication request as the basis for contacting the customer via the customer's at least one RCD using a data entry prompt. The data entry prompt may be a message requesting the input of particular private identification (private ID) information such as a code or other verification data, an original entry of which is created by the customer or generated when the customer's account are initially linked to the system and which may be changed as required.

Information relating to one or more private IDs, and one or more RCDs of the customer are stored by the system, but kept separate from the account information of the customer which is maintained by the systems of the relevant institution. The information relating to a particular customer in the system and the systems of the financial institution using a unique security identifier (Security ID) which does not necessarily relate to an identifying characteristic of the customer or the customer's RCD, and not even required to be provided to the customer.

The system compares the private ID information received from the customer, or aspects of the information provided, pursuant to the data entry prompt, to the private identification data maintained by the system for verification purposes. Advantageously, the respective private identification data from the customer and that stored by the system are secured with encryption mechanism such as hashing.

The most preferred form of contact with the customer for authentication purposes is the system using an interactive voice response (IVR) component, which is a computerised system that allows a person, typically a telephone caller, to select an option from a voice menu and otherwise interface with a computer system. Generally the system plays prerecorded voice prompts to which the person presses a number on a telephone keypad to select the option chosen, or speaks simple answers such as "yes", "no", or numbers in answer to the voice prompts.

The latest systems use natural language speech recognition to interpret the questions that the person wants answered. The newest trend is Guided Speech IVR which integrates live human agents into the design and workflow of the application to help the speech recognition with human context. IVR developed as a telephony system but similar systems are now available that function on non-telephony systems and any functionally equivalent system or combinations of systems can be used.

Typically, an IVR component is included in the at least one communication means and upon the data processing architecture receiving an authentication prompt, the IVR component will typically contact the customer using their preferred remote communications device (RCD). The RCD is likely to be a mobile telephone or similar and the IVR system can then guide the customer through the entry of their identification information to be used in the authentication process. Importantly, the communication means of the system will also typically have the ability to determine the identification characteristics of the particular remote communications means used, such as SIM card numbers or IP addresses, or digital certificates and the like in order to identify the customer according to a multifactor authentication process.

If the verification data entered, matches or correlates to the verification data on file, then the customer is considered to be validated for authorising the transaction. If the verification data entered, does not match or correlate to the verification data on file, then the customer is considered not to be validated and is rejected from the system.

The invalid entry of verification data may also flag a follow up from the system administrator. Preferably, once invalid verification data is entered a predetermined number of times, which may be at least once but preferably no more than three times, that customer may be locked out of the system for a period of time. The lockout may be active on the customer account(s) or may be limited to lockout of access to the system from the particular remote communications means used by the customer as determined using the identification characteristics of the particular remote communications means used.

Once authentication is granted or declined, an appropriate indication is provided to the relevant financial institution(s) and a suitable message advising the customer of the outcome of the authentication process is preferably generated by the data processing architecture and forwarded to the customer's preferred RCD.

In one form, the type of fraud associated with the fraudulent transaction may be determined by the data processing means or authentication server, and an indication to the institution of the type of fraud determined may be communicated. For example, the type of fraud may include a Man-in-the-Middle attack and/or Identity Theft. Indicating the type of fraud is particularly advantageous for criminal authorities such as the police, who can then quickly investigate the relevant fraud without requiring significant additional contact with the customer. It also allows the institutions to maintain a record of the types of fraudulent activities occurring on their accounts.

It is noted that the types of fraudulent activity which may be determined is not limited to only those types herein described.

Where a fraudulent transaction has been indicated, information may be provided to the institution in order to maintain contact with the fraudulent party by the second communication means or authentication server. This may then allow authorities, such as the police, sufficient time to capture the fraudulent party.

In another form, the IVR system may be arranged to provide the customer with a plurality of alternative feedback options. For example, the feedback options may include at least one of authorising the transaction, cancelling the transaction, indicating the transaction as fraudulent, indicating the transaction details are incorrect, or indicating the customer did not initiate the transaction.

In some forms, the additional feedback options may be provided upon the customer selecting at least one of said alternative feedback options. The additional feedback options may be provided to the customer upon the customer authorising the transaction. In some implementations, at least one of the additional feedback options may include the customer being identified with additional security identifier data, in order to provide an even higher level of authentication. The improved system requires the initiation session to be separate from the secure authorisation session, which allows the customer to enjoy the additional options within the secure authorisation session.

BRIEF DESCRIPTION OF THE DRAWING(S)

Preferred embodiments of the present invention will now be described with reference to the accompanying drawings, in which.

DETAILED DESCRIPTION OF THE PREFERRED EMBODIMENT(S)

The present invention is not specific to any particular hardware or software implementation, and is at a conceptual level above specifics of implementation. It is to be understood that various other embodiments and variations of the invention may be produced without departing from the spirit or scope of the invention. The following is provided to assist in understanding the practical implementation of particular embodiments of the invention.

Figure 1:
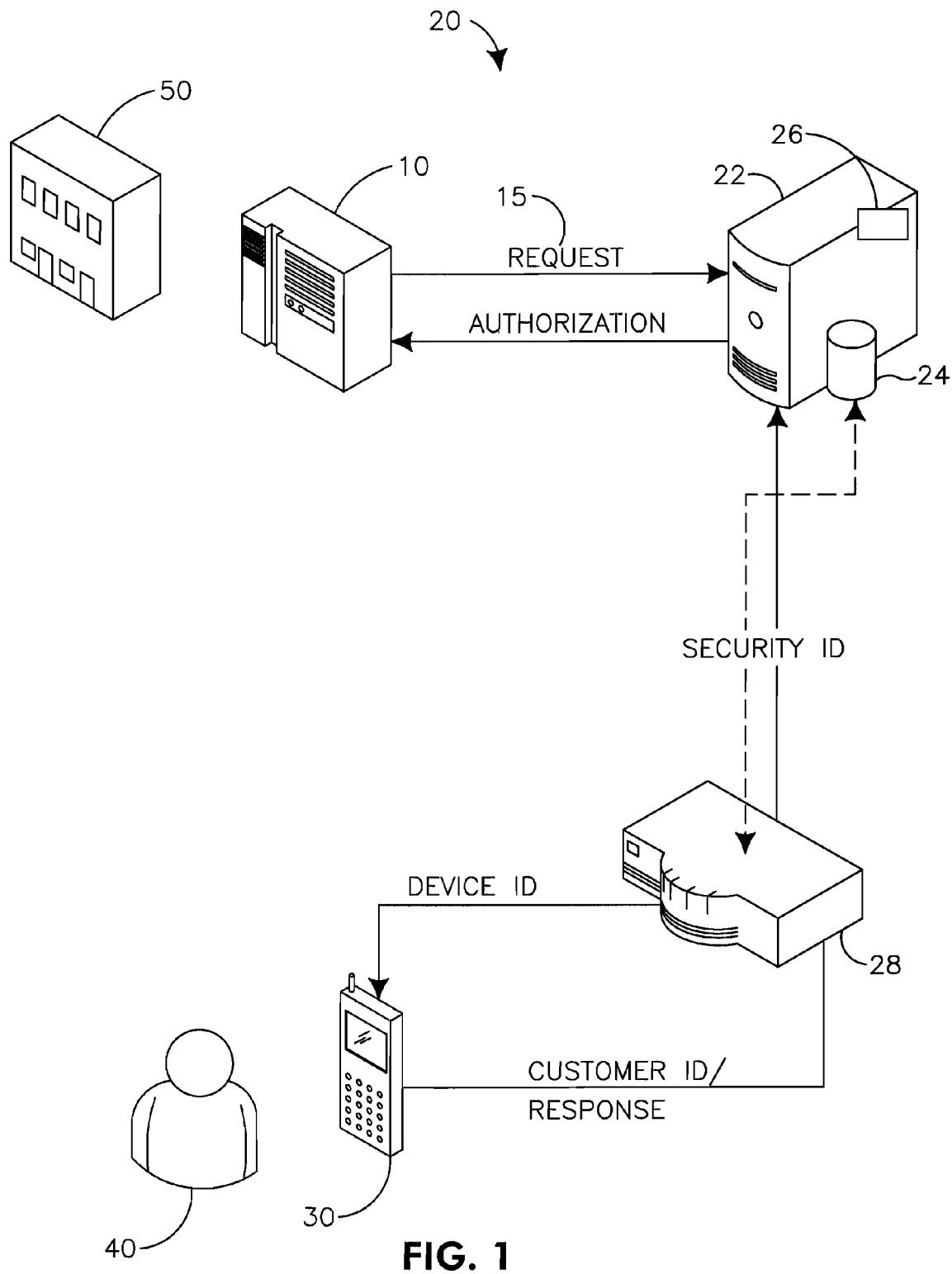
FIG. 1 is a context diagram providing an overview of a preferred embodiment of the invention.

The authorisation system 20, as shown in FIG. 1, includes a data processing means, i.e., server 22, with communication means 26 which communicates with an institution system 10 of an institution 50 and a customer device 30 of a customer 40. The customer 40 is generally a customer of the institution 50, but may be an employee, supplier, citizen relating to a government agency or similar. In various circumstances, therefore, the customer 40 may be identified by the institution system 10 using any form of public identification data (Public ID), such as an account number, credit/debit or other card number, employee number, login name, password, or other suitable identifier. In some instances, a combination of these identifiers may be used as a Public ID.

Identification information relating to, for example, the institution 50, the customer device 30 and the customer 40, are securely stored in database 24 of the authorisation system 20. The database 24 may take any one of several forms, for example, a single central database, a distributed database or a number of secure databases.

It will be appreciated that while the authorisation system 20 is discussed in the context of a financial institution, such as a credit card issuer, the institution 50 may be any organisation requiring secure authorisation of a transaction. Examples of such institutions include an employer, bank, government agency, share broker or any other entity which is seeking secure identification or authorisation.

It will also be appreciated that while the authorisation system 20 is discussed in the context of a financial transaction, the transaction may take other suitable forms, such as for example, a request for identification of the customer 40. Examples of transactions requiring authorisation by the authorisation system 20 include an online or over the counter financial transaction, a request to approve a share purchase or sale, or a request for identification which may be required for the customer 40 to enter a building, open an account, or deal with an institution or government agency.

In one form, the authorisation system 20 and the institution system 10 may be hosted in the same secure environment to minimise the chances of communications between them being intercepted by an unauthorised party or if the authorisation system 20 is being incorporated by the institution 50 into their own secure processing layer.

However, where the authorisation system 20 and the institution system 10 are hosted in separate physical environments, communications between them should preferably be facilitated via a secure link such as a direct connection, preferably utilising "off-net" (i.e., non Internet or web based) technologies such as a frame or a secure point to point connection. Where the authorisation system 20 and the institution system 10 communicate via the use of 'on-net' technologies, strong authentication and encryption methods, such as VPN tunnelling with challenge authentication or similar technology such as Client/Server certificates, should preferably be used. In such cases, it is preferred that the data communicated across the connection is encrypted with a minimum encryption of 128 bit. Additional security may be provided by authenticating the data packages using a HMAC (Keyed-hash Message Authentication Code) algorithm in which the institution system 10 is provided with a secret key and all information sent by the institution system 10, is hashed against the key to authenticate the data. Furthermore, additional security layers for transmitted data also can be added if required, such as for example encryption hardware.

It is preferred that changes to the authorisation system 20 should be automatically logged and maintained within a secure audit trail which cannot be changed even at a privileged or administration access level, and should be available in a report format.

Figure 2A:
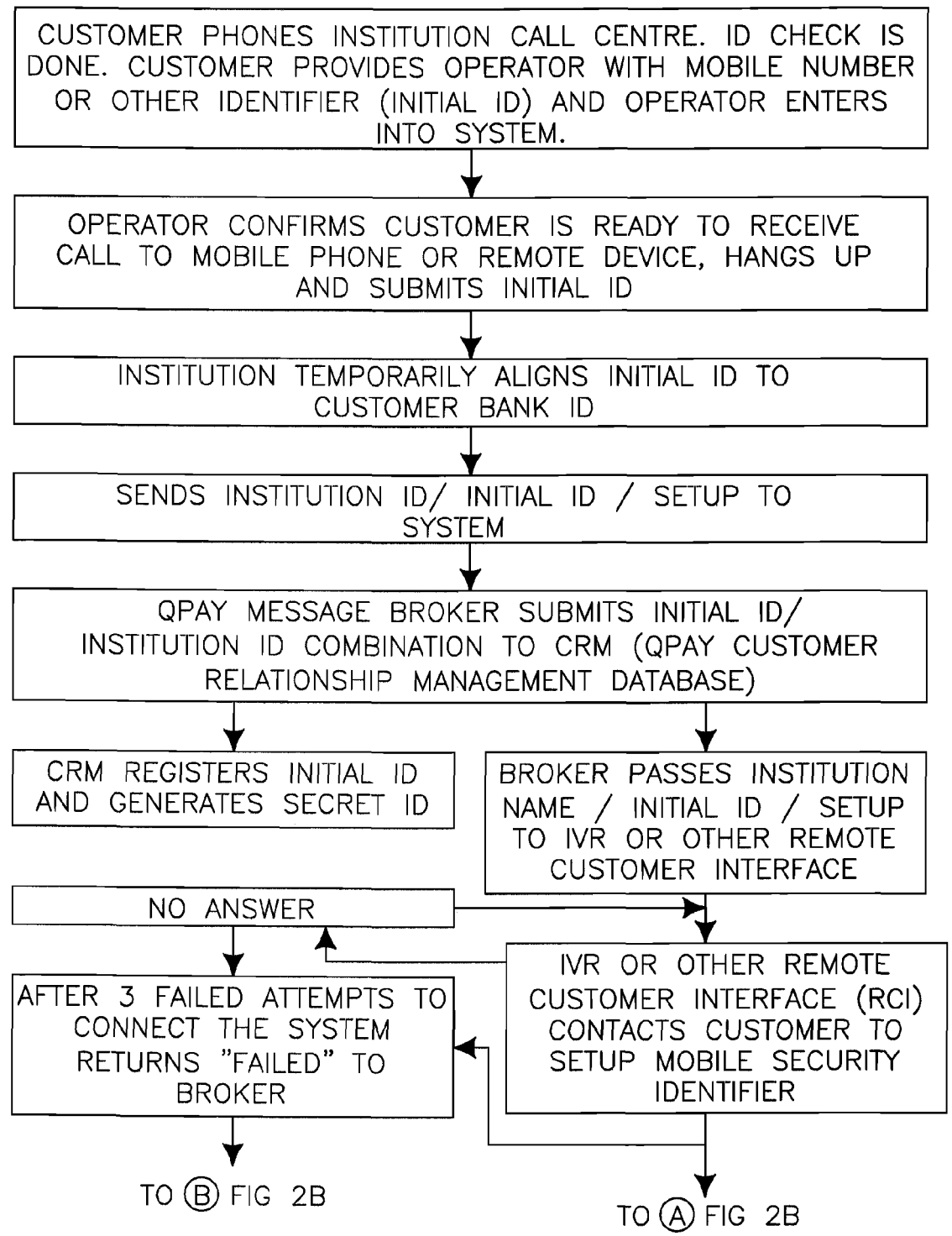
FIG. 2 is a flowchart outlining the setup process of a preferred embodiment of the invention.
Figure 2B:
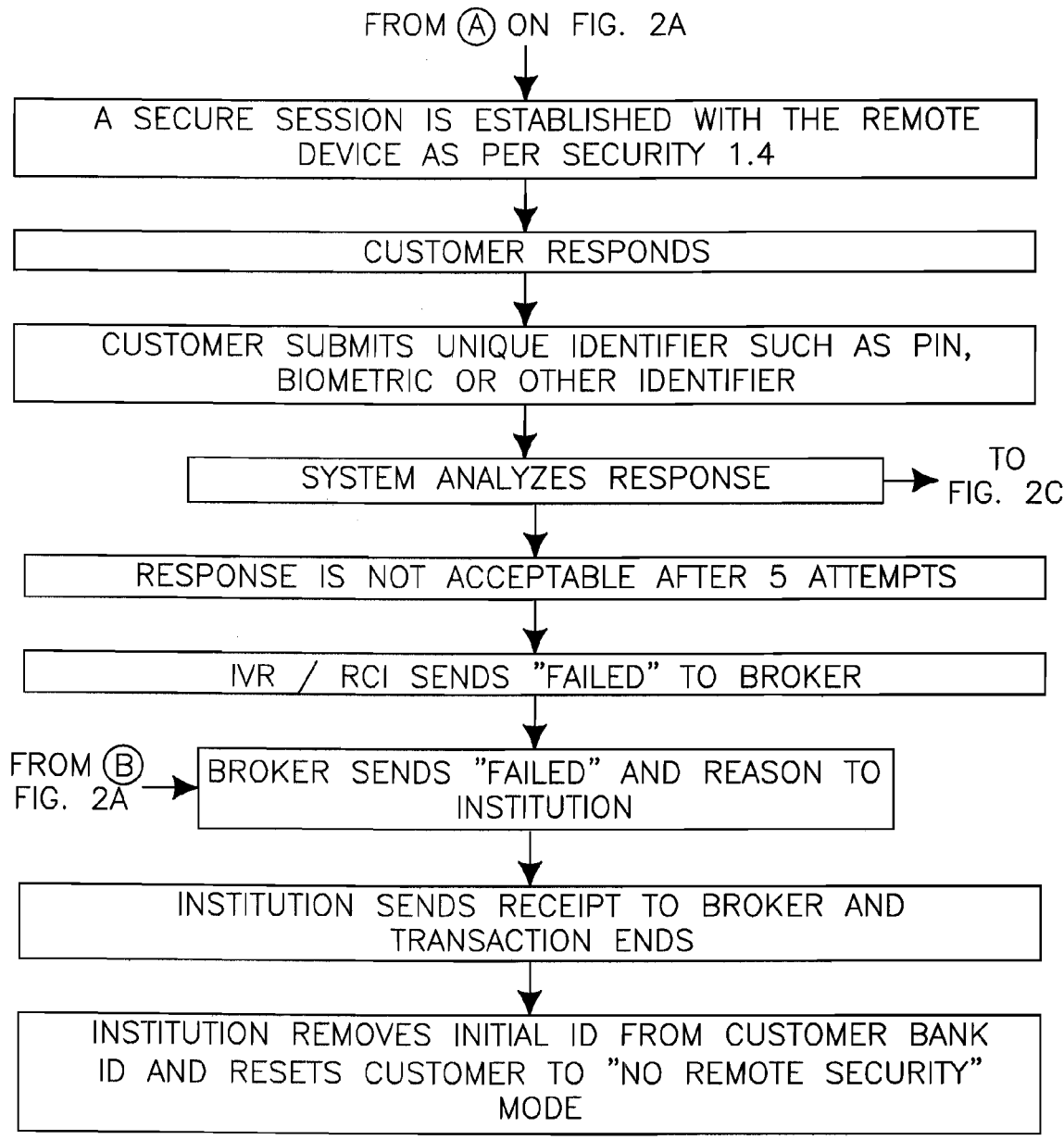
Figure 2C:
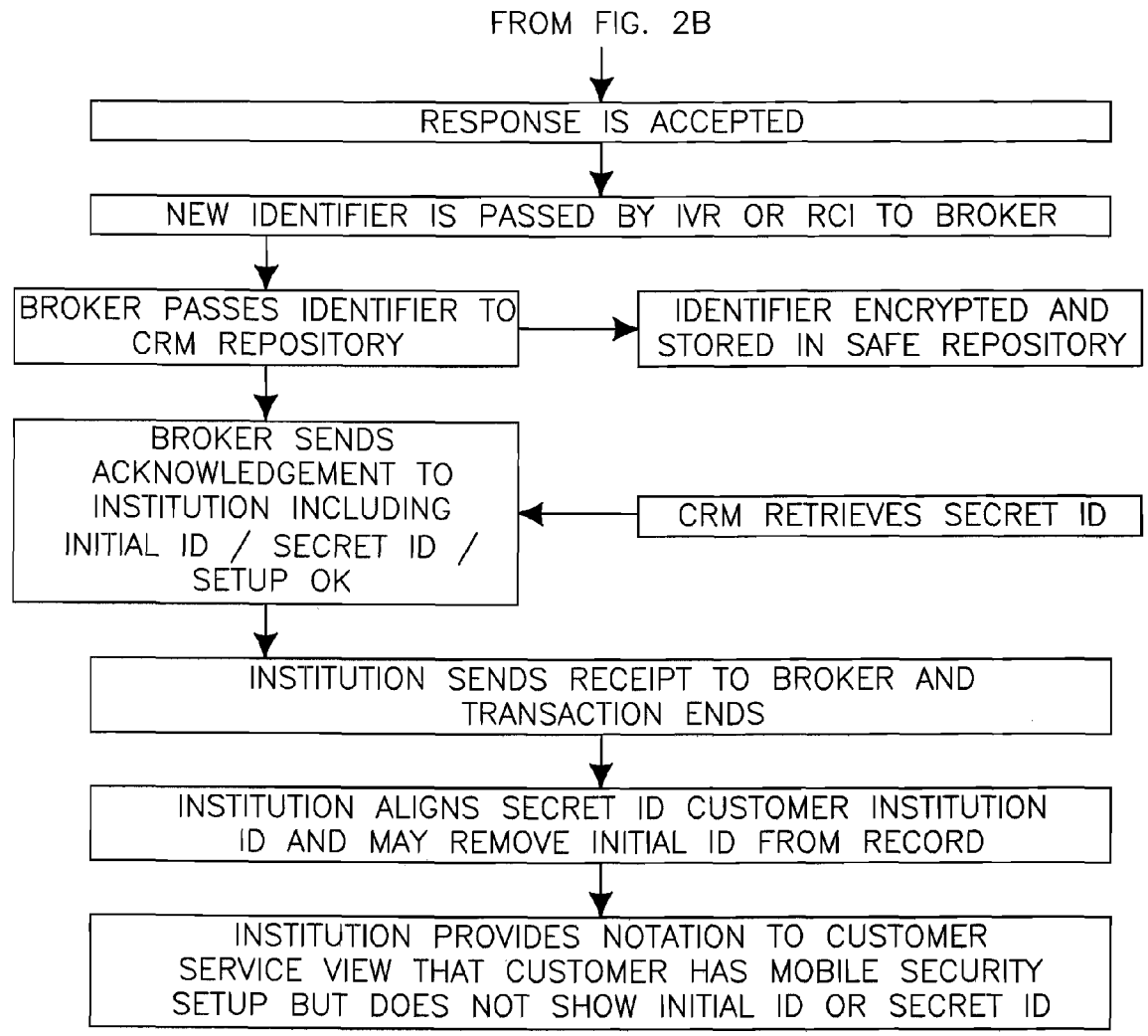

Whether the authorisation system 20 and the institution system 10 are securely co-located or securely connected remotely, a unique security identifier, hereinafter referred to as the Security ID is used to correlate the information relating to the customer 40 in both the authorisation system 20 and the institution system 10, once the setup procedure, as shown in FIG. 2, has been completed for a new user. The Security ID negates the need to constantly transmit identification information about the customer 40 or customer device 30 (discussed below) which may be more easily recognised by third parties.

In this way the account information of the customer 40, stored in the institution system 10, is kept substantially independent from the authorization system 20.

In other words, the use of the Security ID ensures that if either the authorisation system 20 and the institution system 10 is successfully attacked and the records of the customer 40 are accessed by an unauthorised party, there is minimal opportunity for the attacker to obtain the full set of information, and more specifically, identifiers required to complete a transaction, which are discussed in further detail below.

In order to maximise the security of the communications and information stored within the database 24, it is preferred that the Security ID is not visible to the customer 40, or the call centres for the institution 50 or the authorisation system 20.

So as to facilitate correlation of the transmitted data with the data stored by the institution system 10, the Security ID may be correlated in a secure manner to an existing unique identifier used by the institution system 10, such as for example, an account number of the customer 40. Similarly, the Security ID may be correlated in a secure manner to a unique identifier within the authorisation system 20, which may or may not be visible to call centres, etc.

During the customer setup process in the system 20, the Institution 50 passes the Device ID to the system 20. The system 20 contacts the customer 40 (via the device 30) "off-net". At this point the customer 40 is able to follow the required steps to establish at least one Customer ID. The system 20 then passes back to the Institution 30 the Device ID, and a new unique security identifier (Security ID). Thereafter, the only identifier relating to the customer 40 and/or the device 30, which passes between the Institution 50 and the system 20, is the Security ID. In an alternative embodiment, the customer setup process may commence in the system 20, and the Device ID, Security ID, etc., are pushed by the system 20 to the institution 50 at the customer's 40 request.

Therefore, for a fraudulent user seeking to gain unauthorised access to a complete dataset, they would need a customer's 40 Public ID, the Device ID and the Customer ID. To gain all this information, they would need to attack and gain unauthorised access to the Institution system 10, follow a transaction to the authorisation system 20 and attack the link between the system 20 and the customer device 30. Thereby, in an example set in the banking context, the unauthorised user would need to attack and gain unauthorised access to the bank, the authorisation system 20 and the mobile phone network on which the device 30 is connected.

Figure 3A:
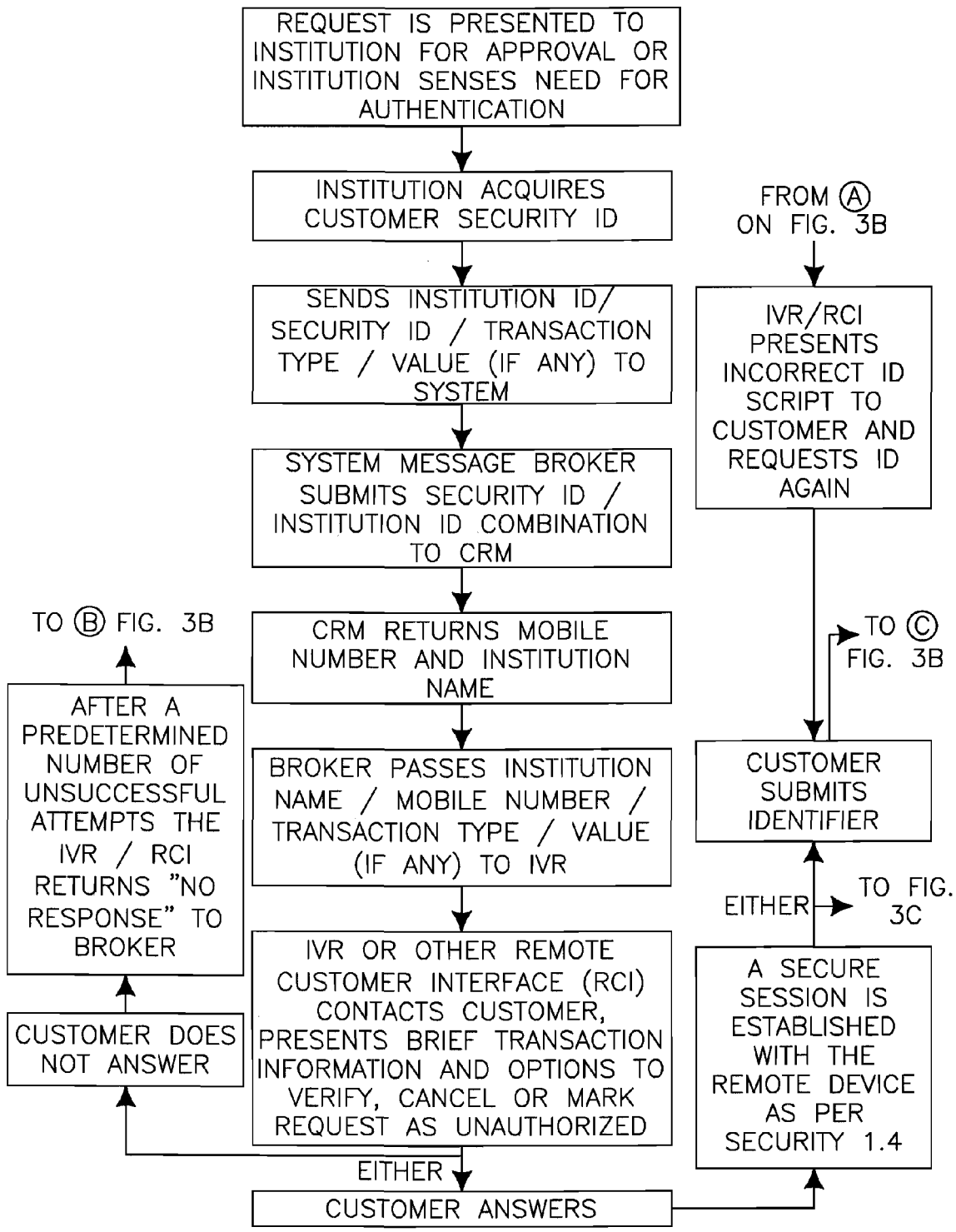
FIG. 3 is a flowchart outlining the authorisation process of a preferred embodiment of the invention.
Figure 3B:
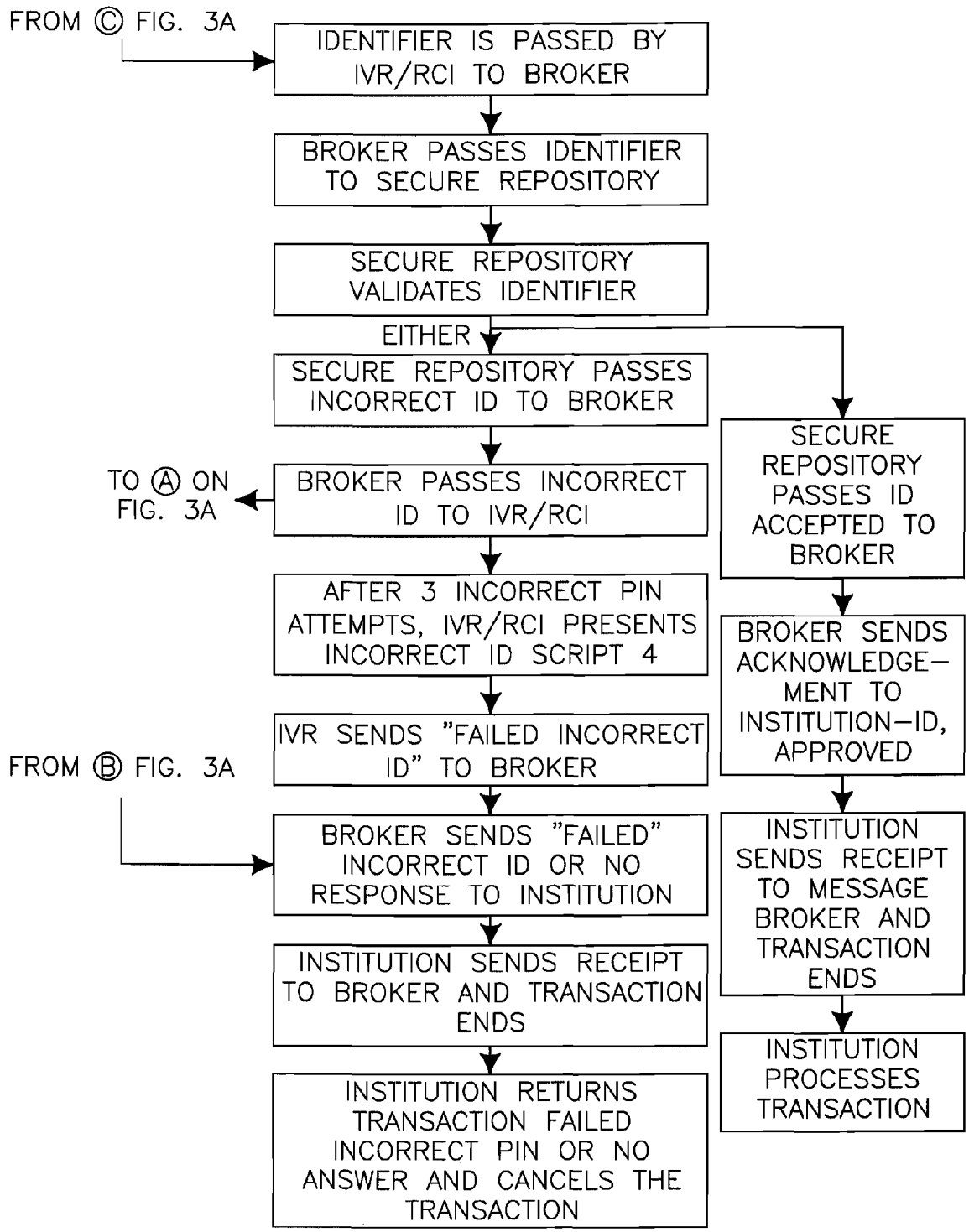
Figure 3C:
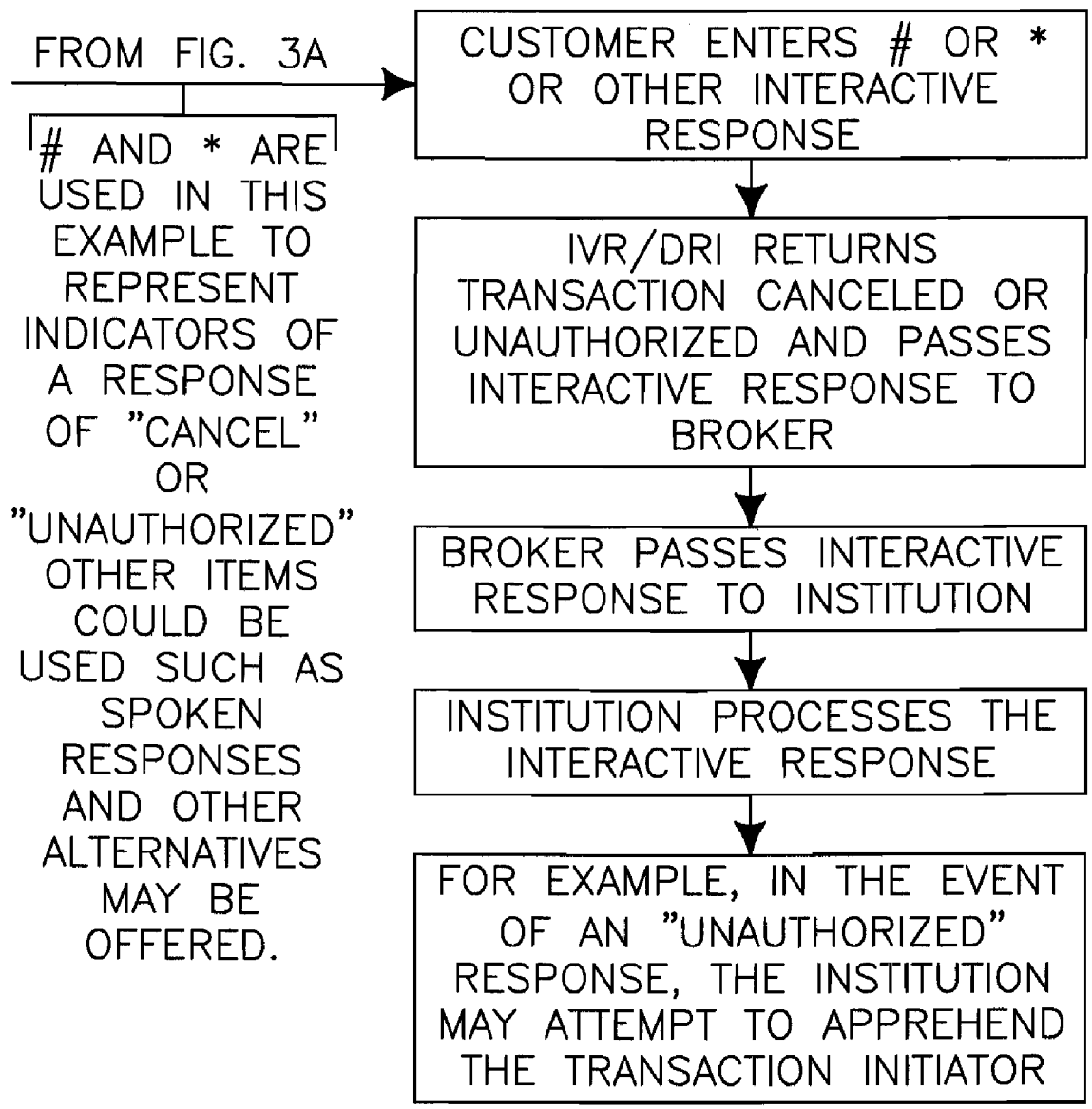

In a typical financial transaction situation, as shown in FIG. 3, the merchant or similar organisation will request the institution 50 for authorisation of the transaction. In some cases, where such authorisation is not requested by the merchant or where the transactions are internal to the institution 50, the institution 50 may itself request authorisation of the transaction. It is as this point that the institution system 10 sends an authorisation request 15 to the authorisation system 20, which in turn contacts the customer 40 for authorisation of the transaction.

Where the authorisation system 20 is connected to a number of institutions and/or institution systems, the authorisation request 15 may include a unique identifier to identify the institution 50, hereinafter referred to as the Institution ID, which is communicated to the authorisation system 20 with the authorisation request 15. In situations, for example, where the institution 50 hosts the authorisation system 20, the Institution ID may not be necessary. Also, it will be appreciated that the Institution ID may be in different forms such as the internet protocol (IP) or media access control (MAC) address of a server, or a combination of identifying numbers and/or letters.

The customer 40 is contacted by the authorisation system 20 on the customer device 30. The customer device 30 may be a handheld device such as a mobile phone or personal data assistant (PDA), or a portable computer such as a laptop. It is intended that the customer 40 is contacted on a portable device carried with the customer 40 as this will ensure that transactions can be authorised as required and without unnecessary delay.

It is preferred that the communication with the customer device 30 is conducted over an off-net communication network (i.e., non-internet or web based technology), particularly in situations where the transaction itself has been conducted over the internet or web. In this way, even if the transaction session is compromised, the authorisation process remains secure as it is carried out over a different communication network and is therefore unlikely to be also compromised. Also, where a communication network, which is the same as the one over which the transaction is conducted, is used, the authorisation process may be conducted over a separate session to the transaction session, or may itself be affected over more than communication session.

In order to establish a secure communication session between the authorisation system 20 and customer device 30, suitable security measures are adopted. The exact nature of these security measures will of course be determined by the type of device, the connection method used and the network type.

For example, in the case of a GSM mobile phone, a 128-bit Ki within the mobile's SIM is used to uniquely identify the device to the network. A 128-bit random challenge (RAND) is provided by the network with the device then providing a 32-bit response (SRES). A 64-bit ciphering key (Kc) creates a basis for encryption during the session. Underlying algorithms include A3 (authentication), A5 (Encryption) and A8 (Key Generation), and other security layers as required.

In the case of a CDMA device, the electronic serial number and an A-key programmed into the phone are used to uniquely identify the device to the network. A random binary number (RANDSSD) is generated by the network with the device responding with a required 128-bit sub key called a Shared Secret Data (SSD). Part of the SSD is used for authentication, and part for encryption, and underlying algorithms may include standard CAVE, CMEA, E-CMEA, or ORYX in the case of data. In addition to the foregoing, CDMA2000 and WCDMA can be used to apply additional layers of security such as SHA-1, AES, the Kasumi and Rijndael algorithms and the AKA protocol.

In the event that Wi-Fi (802.11 base technology), Bluetooth® and other Near Field Communication technologies, as well as long range communication technologies, are used to communicate with the customer device 30, it is preferable to implement strong security practices available with such technologies.

In order to identify the customer device 30 to the authorisation system 20, a unique device identifier, hereinafter referred to as the Device ID, of the customer device 30 may be compared to the Device ID provided by the customer device 30. Examples of such identifiers include a phone number, an International Mobile Equipment Identity (IMEI) which is a number unique to every GSM and UMTS mobile phone, IP or MAC address, or any other form or combination which uniquely identifies the customer device 30 to the authorisation system 20.

It will be appreciated that in some cases, for example, where the Device ID includes a phone number, the information therein will be used to also initiate a communication with the device 30. However, where the Device ID consists only of devices identifiers such as a MAC address, which in themselves are not able to be utilised to initiate a communication with the device 30, additional contact information for communicating with the device 30 may also stored by the system 20.

Figure 4:
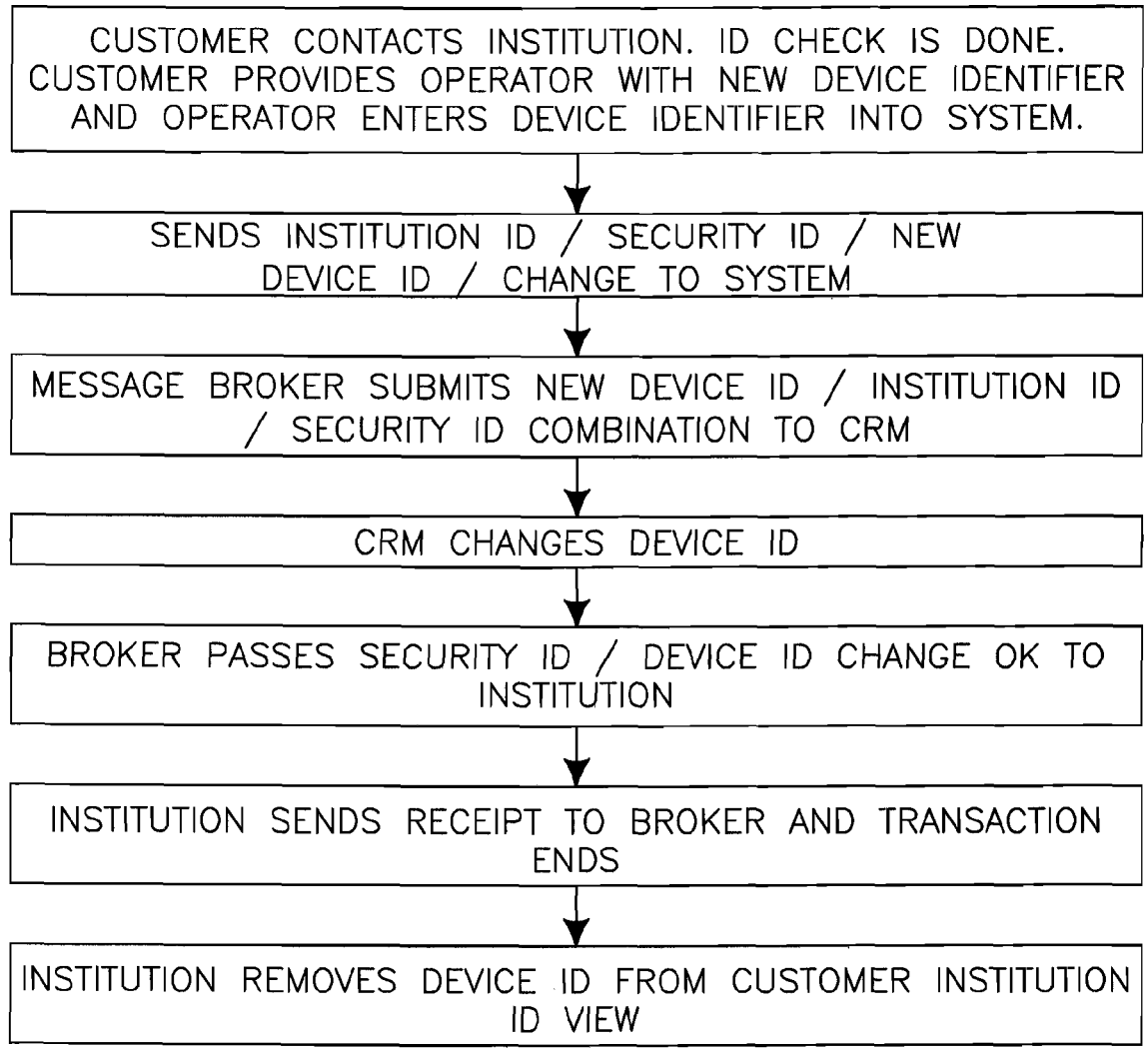
FIG. 4 is a flowchart outlining the device changing process of a preferred embodiment of the invention.

The authorisation system 20 provides a procedure, as shown in FIG. 4, for changing the Device ID stored in database 24, for example, if the customer 40 obtains a new customer device 30.

In order to authorise the transactions, the customer 40 is prompted by the authorisation system 20 to provide at least one unique customer identifier, hereinafter referred to as the Customer ID, which is used to ensure it is the actual customer approving the transaction, and not another person who simply may have access to the customer device 30. Ideally, the Device ID and the Customer ID are separately secured and may undergo encryption processes such as hashing during storage and/or communication.

The Customer ID may be a personal identification number (PIN) or password/pass-phrase which is known to the customer 40, a biometric identifier such as a voice print, a secret word, a fingerprint, or any other form of identifier which would usually only be known to, or accessible by, the customer 40.

In a preferred form, an interactive voice response (IVR) system, i.e., IVR system 28, may be used to both prompt the customer 30 for the Customer ID and subsequently receive the Customer ID. An IVR is a computerised system that allows the customer 40 to select options from a voice menu and otherwise interact with the authorisation system 20. Generally the IVR system 28 plays a pre-recorded voice prompt and the customer 40 presses a number on a telephone keypad to select an option and/or speaks an answer, such as the Customer ID, which is recognized by the IVR system 28.

For example, a Customer ID which includes a 4 (or 6) digit PIN is not known or stored by authorisation system 20 in a digitised usable form. When the IVR system 28 receives the PIN via DTMF within the session associated with the call, it is encrypted in the session using MD5, and it is only this hash encrypted MD5 string, which is associated with the PIN, that is communicated back to the authorisation system 20 for validation or storage. This procedure ensures that in the unlikely event that the authorisation system 20 is attacked, and the attacker is able to break the encryption that relates the Customer ID to the Device ID, they would not be able to simulate an authorisation call in an attempt to obtain the PIN in usable form for an IVR system unless the MD5 encryption is reversed. Furthermore, additional security layers for data can be also added if required, such as for example encryption hardware.

In an alternate embodiment, which utilises voice biometrics, the Customer ID is formed by the voice print of the customer 40. This voice print may be calculated by asking the customer to repeat a randomly generated word or phrase such as "Yellow" which allows the voice print of the customer 40 to be captured. Preferably, a future authorisation request will request the customer 40 to say a different word or phrase such as "Tuesday" for enhanced security.

In this way, the authorisation system 20 determines the biometric voice print from the response and compares it to the stored data. As another layer of security, the system 20 may also perform a voice to text conversion of the word or phrase and make a further comparison with the stored data to confirm that the word spoken is in fact the one requested and the voice used is the one recorded. Thereby, to be broken, a user seeking unauthorised access would require not only a high quality recording of the customer's voice, but would also need to use that recording to say the random word requested.

In another alternative embodiment, the system 20 may ask the customer 40 a question to which he or she is likely to know the answer. For example, the system 20 may ask "How much was your last transaction?" or "What is your middle name?" The customer 40 response is compared not only against the stored voice print data but the accuracy of the response is also determined.

Once the Customer ID is provided by the customer 40, the transaction may be considered by the authorisation system 20 as being authorised. Accordingly, the authorisation system 20 communicates the authorisation of the transaction to the institution system 10, which will in turn allow the institution 50 to take the appropriate actions to conclude the transaction.

Figure 5A:
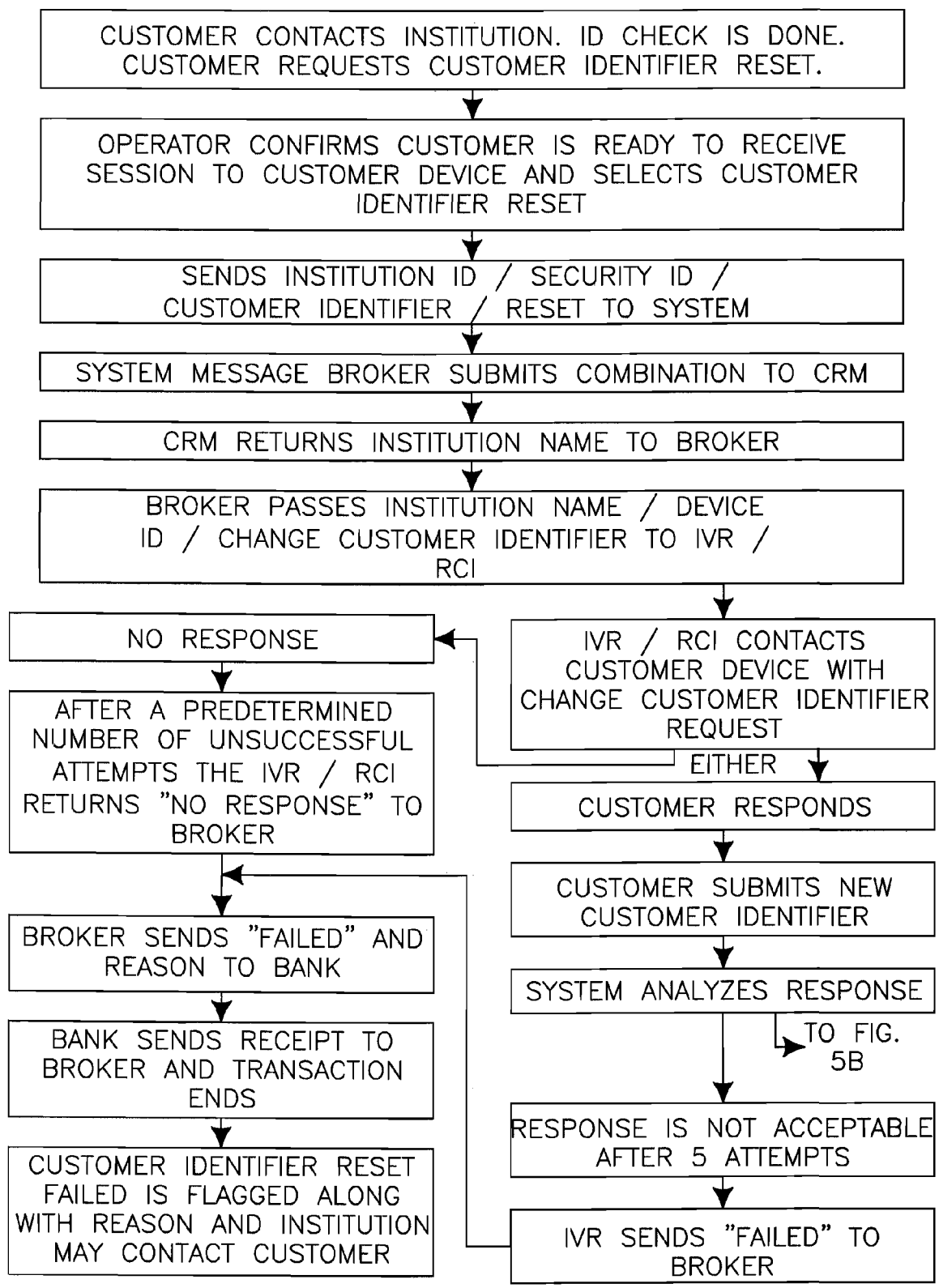
FIG. 5 is a flowchart outlining the customer identifier changing process of a preferred embodiment of the invention.
Figure 5B:
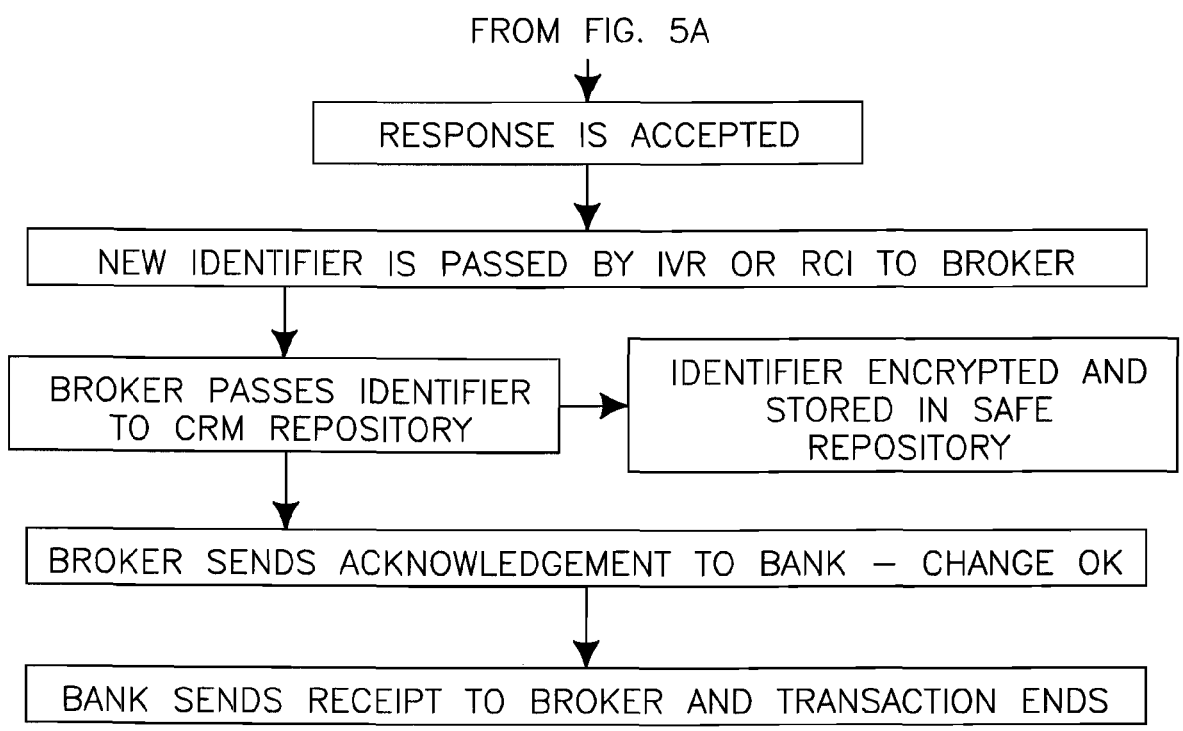
Figure 6:
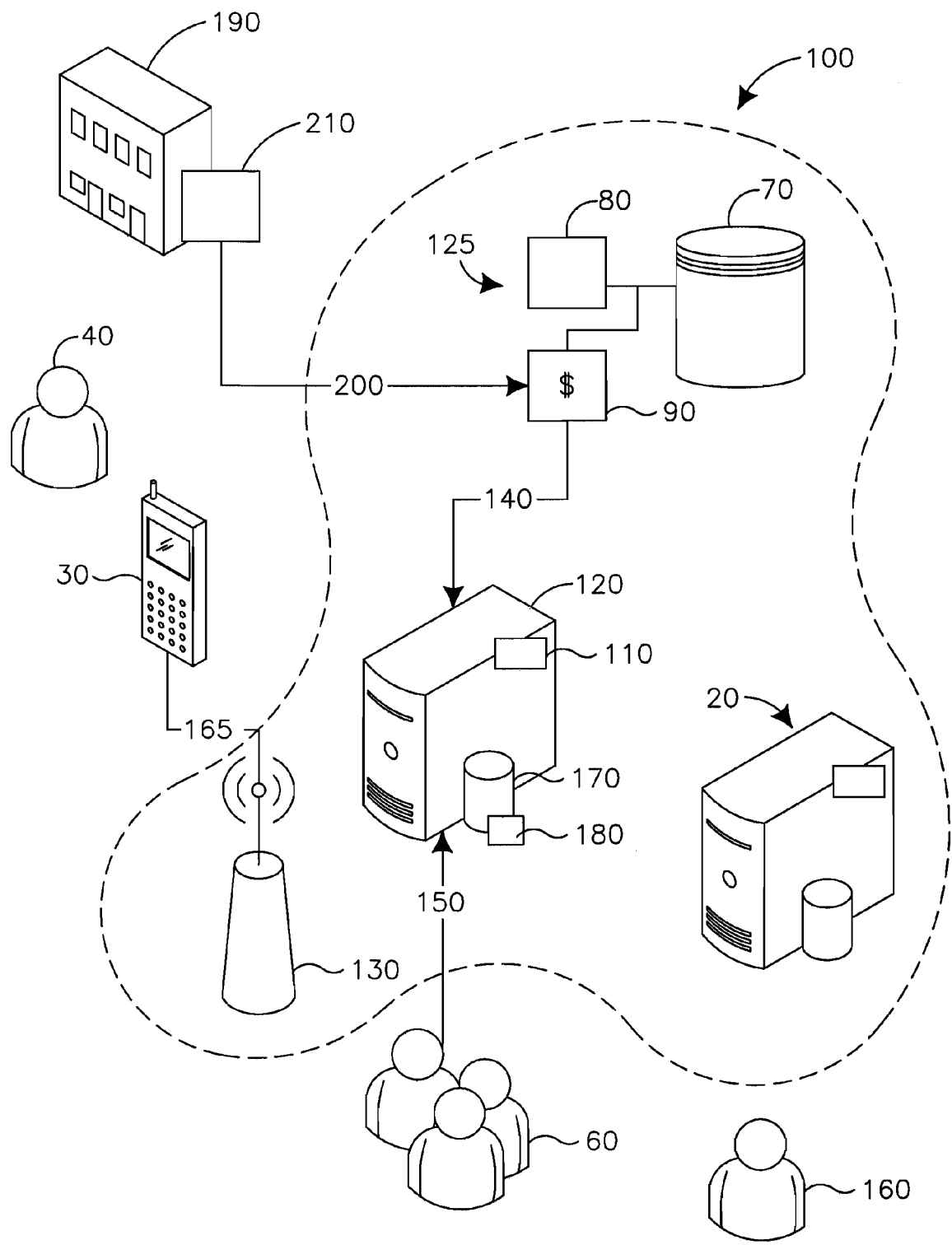
FIG. 6 is a context diagram providing an overview of a remote payment system incorporating a preferred embodiment of the present invention.
Figure 7A:
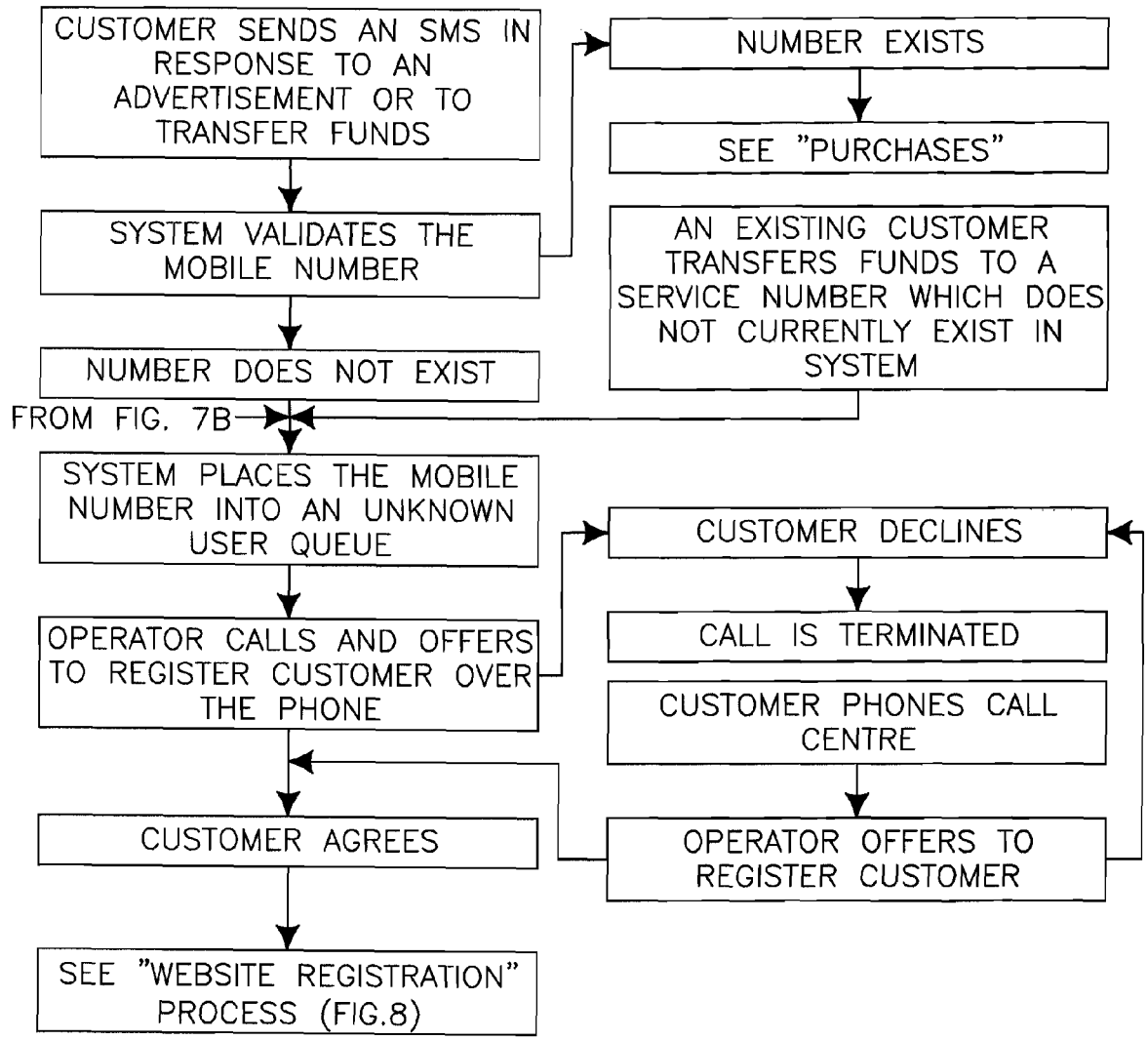
FIG. 7 is a flowchart outlining a customer registration process of a remote payment system incorporating a preferred embodiment of the present invention.
Figure 7B:
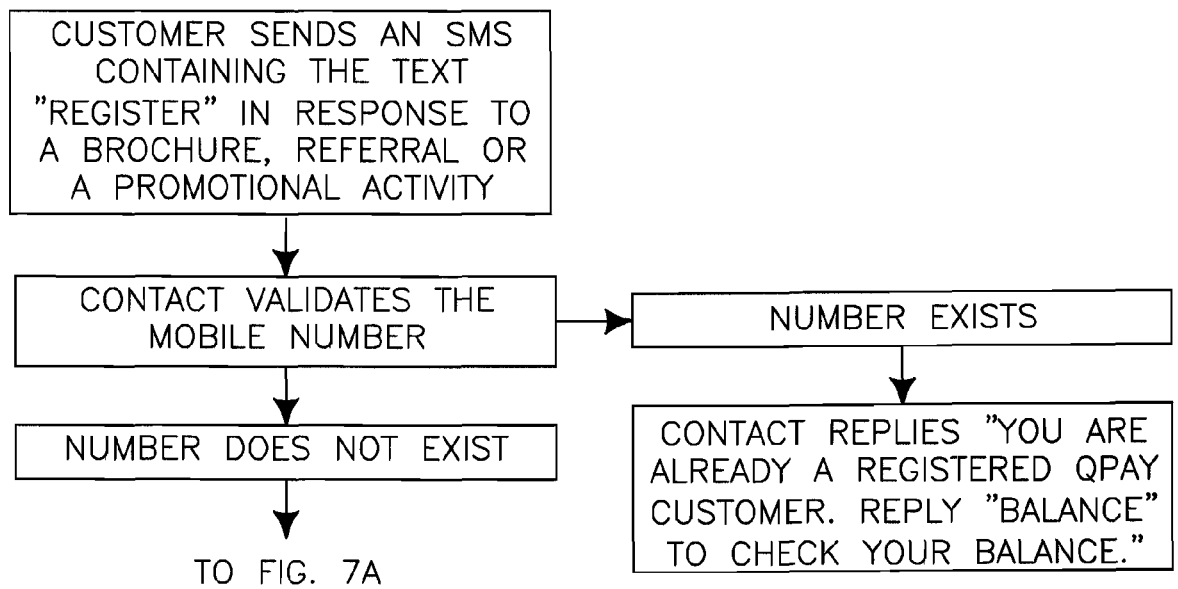

The authorisation system 20 provides a procedure, as shown in FIG. 5, for changing the Customer ID stored in database 24, for example, if the customer 40 needs to change his or her password, PIN, etc.

In certain situations, the customer 40 may need to provide a response to the authorisation system 20, either instead of, or in addition to, the Customer ID. This response may be used to communicate a request to cancel the transaction or flag the transaction as fraudulent, for example. In such situations, the authorisation system 20 communicates the fact that the transaction may be fraudulent to the institution system 10, which will in turn allow the institution 50 to take the appropriate actions to cease the transaction and stop the transfer of funds. In these situations, the customer 40 may be provided with a plurality of feedback options in the IVR request, operatively through the customer 40 keying the respective key on his/her telephone keypad, or repeating the corresponding phrase, for example. The feedback options may include alternative options (e.g., press * or #, after which the IVR is completed), or additional options (e.g., press * or #, the choice of either resulting in additional IVR options then provided for the customer), or both alternative and additional options (e.g., press * or #, with * ending the IVR process, or # resulting in additional IVR options then provided for the customer).

The plurality of feedback options available to the customer 40 may be diverse and dependent on the type and reason for the authorisation, and the type of institution. As examples, the options may include notification of particular types of fraud, or to gain access to a different system, process, protocol, menu or sub-account. The options may be negative, for example, stop transaction due to a particular type of fraud, or positive, for example, offering a broader range of alternatives by passing across to a sub-menu or secondary security process. The options may be presented instead of, before, or after, the authorisation has taken place.

Figure 14A:
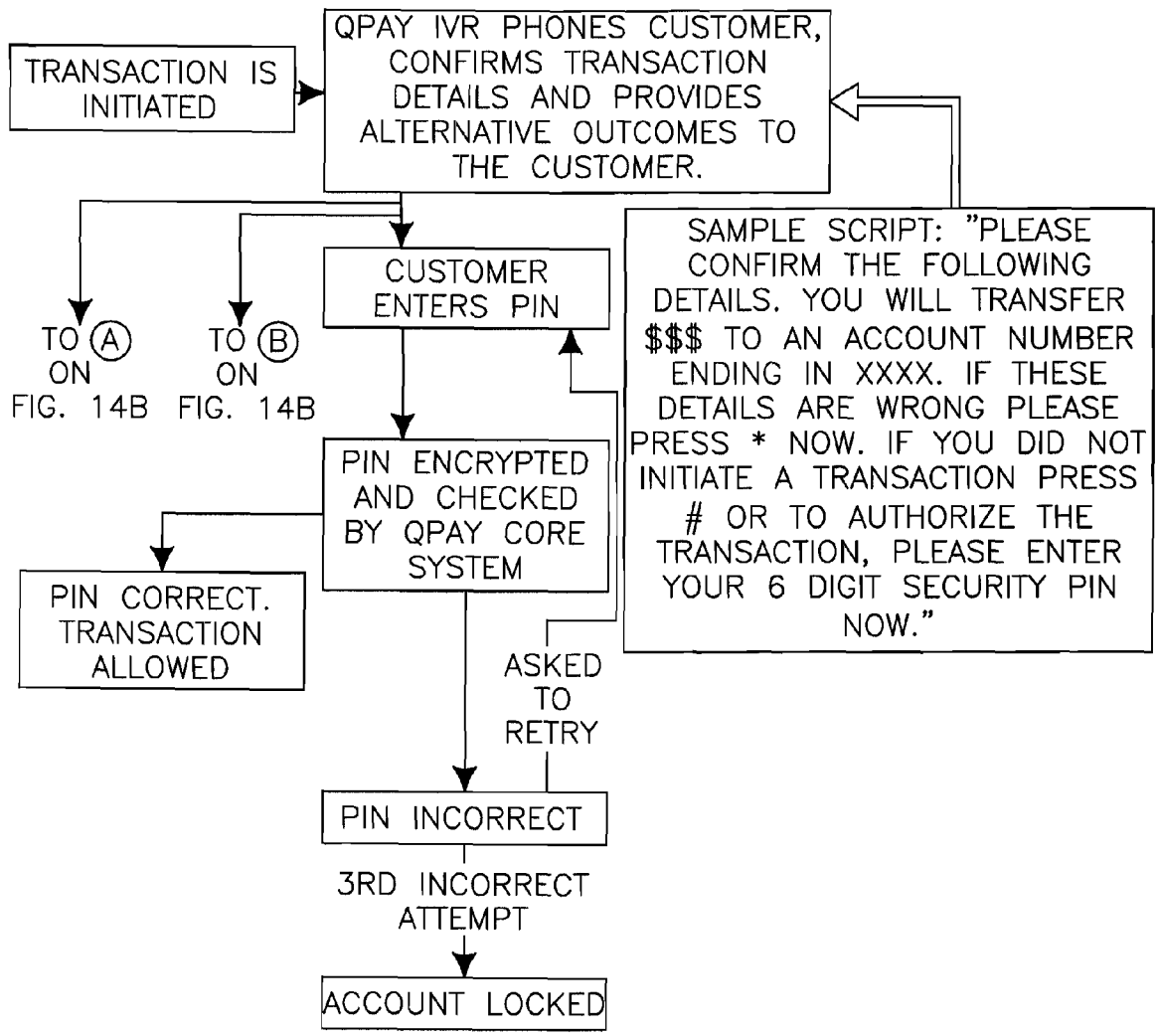
FIG. 14 is a flowchart outlining a multiple feedback fraud determination process of a preferred embodiment of the present invention.
Figure 14B:
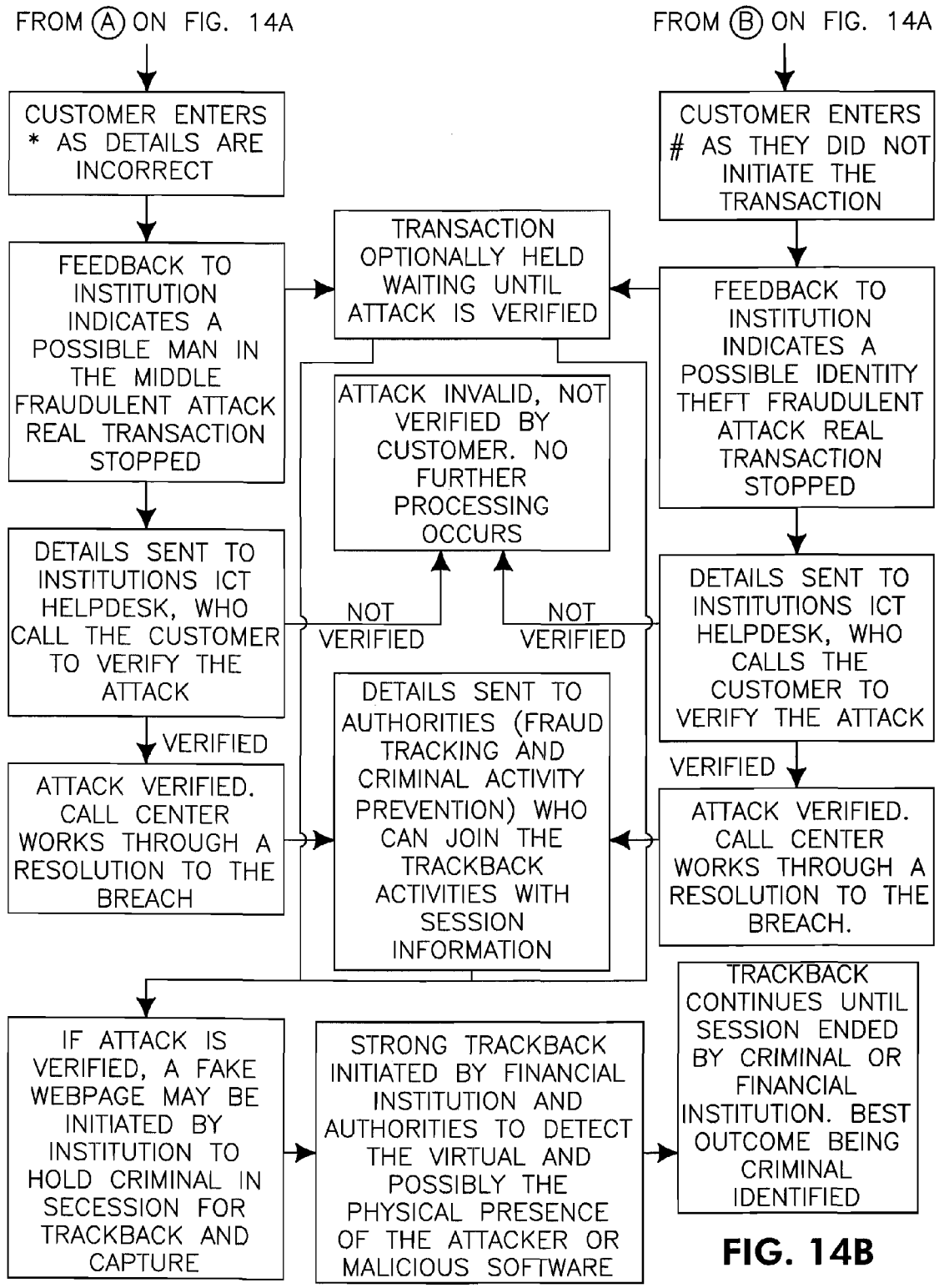

One particular implementation is described in FIG. 14. FIG. 14 outlines a fraud identification process where the customer 40 is able to provide a feedback response to the authorisation system 20 relating to the transaction as alternative options to indicate the transaction as authorised or unauthorised. The process allows the customer to select one of three alternative options, and based on the chosen option, the system determines the type of fraud that is taking place. The determination of the type of fraud may then be forwarded onto the institution for further action and investigation.

In particular with reference to FIG. 14, the customer 40 is contacted via the IVR to authorise a transfer of funds from a certain account number. The IVR provides the customer 40 with three options.

Option (i): enter the PIN or other form of authorisation, thereby indicating the transaction is authorised; or Option (ii): enter the * (star) key (or other indicated key) to indicate the transfer details, for example the amount of transfer or destination or recipient account number, are incorrect; or Option (iii): enter the # (hash) key (or other indicated key) to indicate the customer did not initiate the transaction.

The two latter alternative "unauthorised" options allow the type of fraud to be determined by the system and indicated to the relevant institutions and authorities.

For example, where the star key has been entered by the customer 40, the response is interpreted as a Man-in-the-Middle attack, i.e., fraud where a communication between the customer 40 and an institution 10 has funnelled through an illegitimate web site, potentially transferring the funds to a fraudulent third party account. In this case, in response to the customer 40 feedback, the system will advise the institution 10 of the type of fraudulent activity, and the transaction will be stopped. The institution 10 may then contact the customer 40 to verify the attack and to advise authorities of the fraudulent account details for further investigation.

Where the hash key has been entered by the customer 40, the response is interpreted as an Identity Theft attack, i.e., fraud where a third party has illegitimately obtained account details or other information from the customer 40. Again, in this case the system will advise the institution 10 of the type of fraudulent activity, and the transaction will be stopped. The institution 10 can then contact the customer 40 to verify the attack and to advise authorities of the fraudulent account details for further investigation.

In either case, the system may also provide the fraudulent party with false information via the initiation interface or a fake webpage to keep the third party visible to the institution system longer and to initiate a trace. It is also possible to introduce the authorities (e.g., police) into the electronic feed which may increase the probability of the capture of the attacker.

Figure 15A:
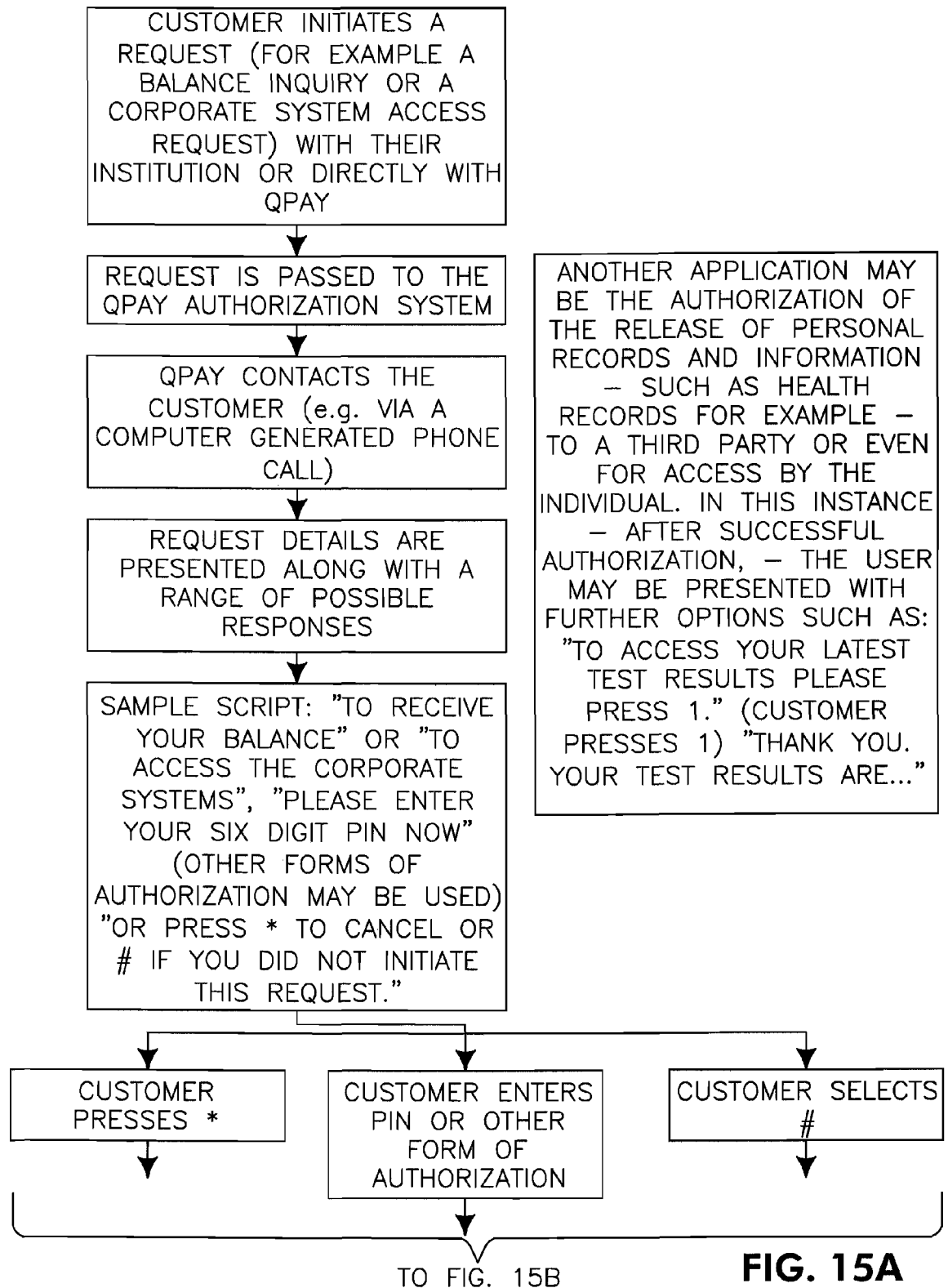
FIG. 15 is a flowchart outlining an additional feedback option process of a preferred embodiment of the present invention.
Figure 15B:
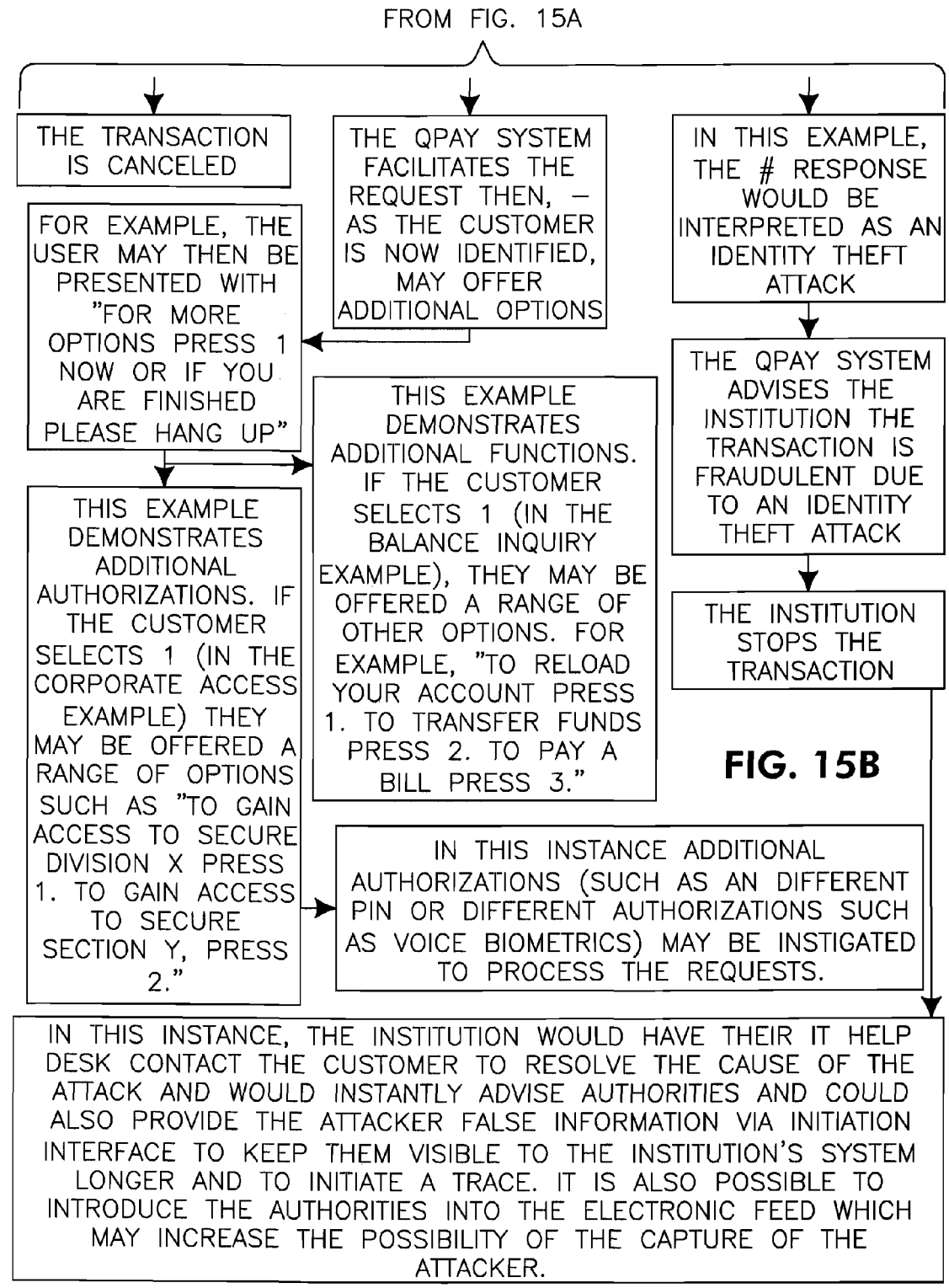

As indicated above, the system may provide additional feedback options in response to the customer 40 initial feedback rather than, or as well as, the alternative feedback options. As one example, as outlined broadly in FIG. 15, a customer 40 may be on the board of a large corporation who has access to the general corporate system in addition to access to a secondary system which holds confidential board reports. In this case, the customer 40 may wish to access the general corporate system, and needs to authorise the access via the previously described system. In order to authorise the transaction, the customer 40 may be asked by an IVR: "We have received a request for you to access the Corporate LAN. If you did not initiate this request, please press * now (option (i)), or to enter the Corporate LAN please enter your 6 digit PIN (option (ii)), or if you wish to enter the Corporate LAN and access a secondary system please press # now (option (iii))". In the instance where the customer selects # (option (iii)), he/she may then be requested via the IVR to present a stronger form of authorisation than a PIN, such as a voice biometric identifier with random question and random word.

As an alternative example, the customer 40 may identify him/herself by inputting his/her PIN and have access to the normal Corporate LAN. Thereafter, the customer 40 may be offered an additional menu with alternative services, such as access to the secondary system which requires an additional form of authorisation. In this case, the system may propose the additional outcomes once the user has proceeded through the initial authorisation process, and therefore residing in the secure system.

As another example, a customer 40 may have sent an SMS to an institution 10 requesting an account balance on their credit card. The institution requests the authorisation system to authorise the request. The authorisation system contacts the customer 40 and the customer 40 identifies him/herself to the system by inputting his/her PIN. Once the ID has been confirmed, the customer 40 may be asked by the IVR: "Your account balance is $97. To top up your account press *. To check your last five transactions press # and for more options press 1".

The difference between the above described system and other simple menu driven systems is its incorporation in a multi-session environment, whereby the initial transaction request is driven from a different session to the subsequent menu driven session. The process in this multi-session environment is, for example:

(i) customer or institution system initiates a transaction, for example, by SMS, voice call, Internet, computer system, i.e., (first) initiation session;

(ii) initiation session terminates or is held while transaction is authorised;

(iii) authorisation system contacts customer, i.e., (second) authorisation session;

(iv) transaction is authorised;

(v) additional alternatives are now provided in the interactive security layer, i.e., in the (second) authorisation session.

Therefore, wherein in simple menu driven systems the customer may be presented with alternatives in the initiation session, the system above requires the initiation session to be separate form the secure authorisation session. This allows the customer 40 to enjoy additional options within the secure authorisation session. It is noted that steps (iv) and (v) above may occur in the reverse order in some implementations.

It is preferred that the Customer ID and the Device ID are stored by the authorisation system 20 in a manner that separates them, for example, by the use an encrypted algorithm. This is to ensure that in the unlikely event an attack on the authorisation system were successful; the attacker could not correlate the Customer ID and the Device ID, and subsequently emulate authorisation of a fraudulent transaction. In one form the Customer ID is stored separately in a triple fire-walled subset within the authorisation system 20 environment.

It is also preferable that the Customer ID is not stored or copied elsewhere during the transaction authorisation process. This may require the facilitation of a pass-through in the IVR system 28 as opposed to a store and validation method.

According to a particularly preferred embodiment, a remote payment system 100 incorporating the authorisation system 20 is provided.

The functionality and use of one implementation of the system 100 is illustrated in FIGS. 6 to 13. The remote payment system 100 allows a customer 40 to transact payments for goods and services remotely in a secure manner with members 60 of the system 100. The preferred implementation of the system 100, according to which the uses of the system 100 are illustrated in FIGS. 6 to 13, includes at least one data storage means 70 for containing updateable data relating to each customer 40, and each member 60 of the system 100, wherein each customer 40 has at least one associated registry profile 80 with a related monetary reservoir 90. The system 100 also includes a data processing architecture 110 having at least one data processing means 120 and a clearing house system 125 for settling indebtedness between members 60 and customers 40 of the system 100, at least one communications means 130 associated with the data processing architecture 110 for communicating with a customer 40, and at least one remote communications device 30 held by each customer 40 for communicating with the communication means 130.

The customer 40 uses the system 100 to transact payments 140 for goods or services pursuant to a payment request 150, the payment request 150 triggering a communications event 165 from the at least one communications means 130 to the at least one remote communications device 30 for the purpose of validating the customer 40 identity and access to the respective registry profile 80, and once the customer's 40 identity has been validated, allowing the customer 40 to transact payments 140 provided a positive balance remains in the monetary reservoir 90.

There will typically be at least two categories of membership of the system, namely business members 60 and customer members 40. There will typically be a plurality of members in each category of membership. Membership of the business member 60 category may be controlled strictly and/or limited by the system administrator 160. Membership of the customer member 40 category may be provided after an application process which may be subject to approval by the administrator 160. Importantly, business members 60 of the system 100 may be customer members 40 of the system 100 as well.

The system administrator 160 will typically offer membership to the business members 60 and the customer members. The membership may require a subscription. Business members 60 may generally pay an annual subscription fee which will allow them access to the system 100. The business members 60 may be provided with a unique identification number and password for identification purposes. The business members 60 may receive regular bulletins and updates about the system 100, as well as results of data analysis performed on the information relating to the system 100. These bulletins may be prepared by the system administrator 160. Typically, information such as this will relate to the program and its benefits, advertising of the program or the like. The system administrator 160 may compile a database 170 containing the details of the business members 60 and any other information or statistics that the system administrator 160 desires.

The business member 60 may collect and/or update information on the customer members 40 of the program that use the system 100 to pay for goods or services of the business members 60. This information may be communicated to the system administrator 160 and may be stored on the customer database 70.

There may preferably be two portions or sectors of the system. The two portions of the system may preferably be known as the front end and the back end. The front end may preferably comprise a user interface. The user interface allows a subscriber or database administrator to access or connect to the back end of the system 100. The front end or user interface may preferably be located or accessible using an Internet browser or mobile telephone, PDA or other personal device with communications ability. Alternatively the user interface may be located on a computer or server or a network of computers or servers. It may be of any suitable type or configuration.

The back end of the system 100 may preferably include at least one data storage means typically a plurality of databases. At least one of the databases may preferably be a customer database 70, containing information about customers 40 and their associated monetary registry 90, and the second database may preferably be a business member database 170, containing information about business members 60 and their accounts 180. Access to each of the databases via the user interface may preferably be differentiated depending on the access or login details. For example, access by a customer 40 may allow only particular or restricted functions to be performed, which may be restricted in a manner similar to the access granted to customer members 40 but with the same or different functionalities whereas access by the system administrator 160 may grant "superuser" status and allow access to all portions of the system 100 and all functions of the system 100.

Typically, a potential member may contact the system administrator 160 in order to subscribe to the system 100. The system administrator may suitably provide the member with a unique username and password to allow access to the system. The member may preferably pay the system administrator 160 a subscription fee in order to access the system 100 for a preset period of time. The username and password may include a Personal Identification Number, an account number, or the username may be linked to identification characteristics of the remote communications means used and the identification characteristics of the particular remote communications means used by the customer 40 may differ according to the type of the device 30 used. For example, computers using hard wired internet connections may use ID means such as Caller Line Identification (CLI) technology, mobile telephony services may allow SIM card identification characteristics to be used and direct internet access to the interface may use the network address or internet protocol address, preferably validated through a service provider as a username.

The above discussion is based around a mobile telephony or computing device. The system 100 can also be used over the Internet for example. Upon opening the predetermined web page, the customer 40 may suitably be prompted to enter their username and password in order to access the system 100. The correct entry of a customer 40 username and accompanying password may preferably allow access to the system 100 as a customer 40.

Use of the system 100 by business members 60 may be slightly different to that of customer members 40. Business members 60 will preferably use the system 100 to notify customers 40 of pending payment requests 150 and to monitor their own account 180 balance. The system 100 may also allow a business member 60 to produce accounting statistical records from the system 100 information.

Use of the system 100 by the system administrator 160 may also preferably be accessed through the front end user interface. In a manner similar to a customer 40 entry of their username and password, the administrator 160 may also have a username and password, entry of which may suitably allow broader on unrestricted access to the system 100 than that allowed to a customer 40.

The correct entry of the administrator 160 username and accompanying password may preferably allow access to the system 100 as the database administrator. The administrator 160 will preferably have the ability to maintain the system 100, including amending the customer registry profiles 80 and virtual wallets 90 to correct errors and also generate reports from the system 100.

Customers 40 may have the option to update their identification details or contact details via, for example, a web interface. Upon selecting the option to modify the customer's 40 details, an editable form is preferably displayed allowing the customer 40 to edit their account details. This may allow the modification of the details such as username, password, contact name and address details including telecommunications numbers, e-mail and customer web site address. Change of identification information in this manner will typically trigger the authentication process to be carried out again.

Specific preferred features of the system 100 are more easily described with respect to use of the system 100 by a customer 40 or business member 60, or by the administrator 160.

Figure 8:
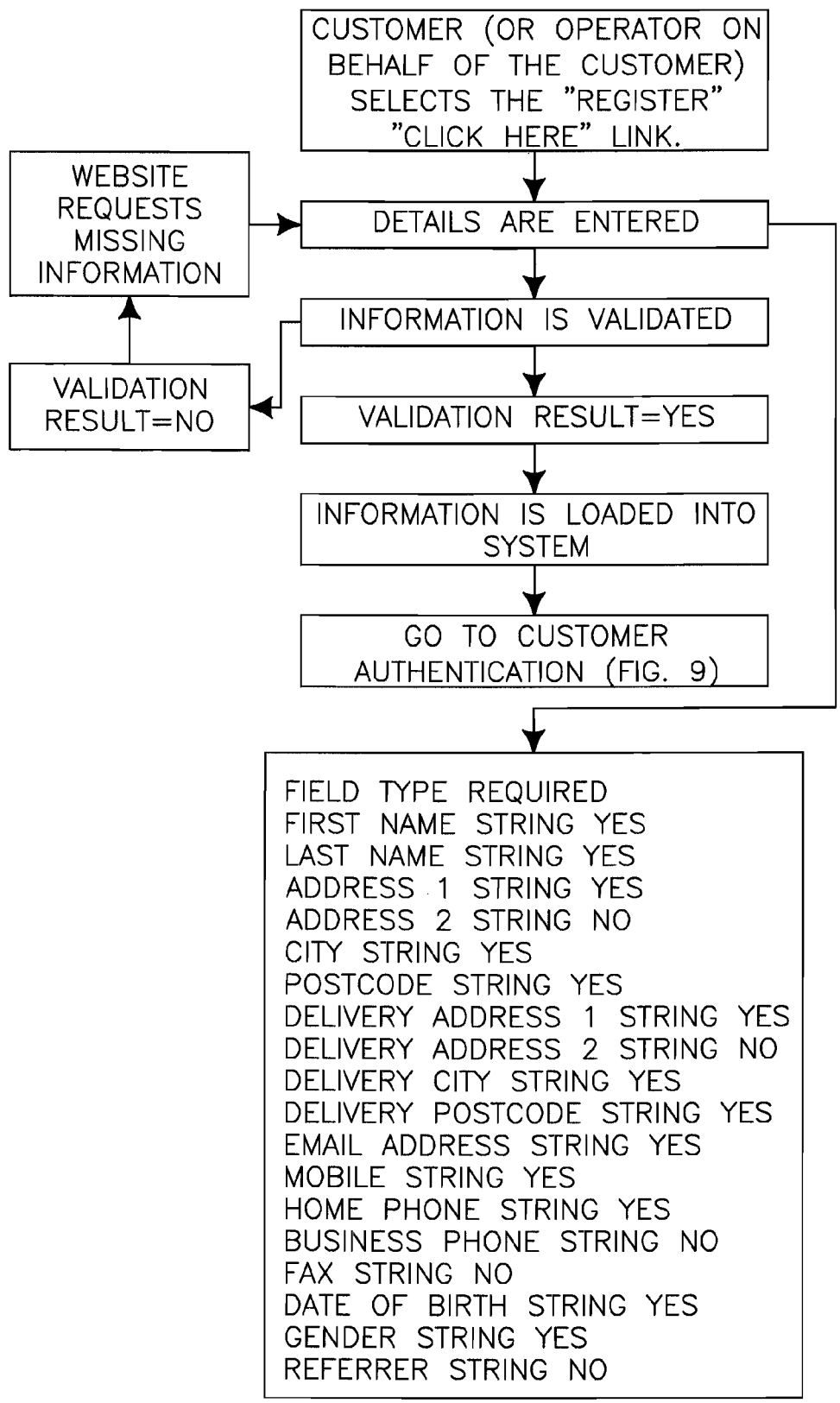
FIG. 8 is a flowchart outlining a website registration process of a remote payment system incorporating a preferred embodiment of the present invention.

The first step in the system 100 will generally be to establish a new customer 40 registry profile 80. The events which can initiate a New Customer Registration together with a preferred process for dealing with the events are identified in FIG. 7. The front end of the system may preferably be reached using an Internet browser to visit a predetermined web site address. This may be performed by either the customer 40 directly using the internet interface or by contacting a customer service officer (CSO) of the system 100 by other means and the CSO using the internet interface to enter the customer 40 details required for initial validation of the customer 40. The preferred implementation of the actual process of New Customer Registration is illustrated in FIG. 8.

Upon selecting the option to enter the customer 40 details, an editable form is preferably displayed allowing the customer 40 (or CSO) to enter (or edit) their subscription details or account details. This may allow the modification of the details such as username, password, contact name and address details including telecommunications numbers, e-mail and customer 40 web site address. It may also include other background data such as date of birth, referrer and bank details. If any of the identifying information entered is already in use or piece of information are missing, a prompt may be issued to request the information or correction of the information.

Once the customer 40 identification information has been validated by a preferred primary validation procedure, the information entered may be used to create a customer 40 registry profile 80 and monetary reservoir or "virtual wallet" 90.

The customer 40 debit or credit account details will generally be provided at the registration procedure to the system administrator. Preferably, these details are not stored by the system administrator, but rather passed to the financial service provider 190 for validation and storing of the data. When a transaction is invoked and authorised by the system, the request is passed onto the financial service provider 190 for processing. In this case, the system administrator 160 does not store the debit or credit account or card data, and accordingly the customer's details will not pass online either at registration or during a transaction.

Funds for use in the system 100 of the present invention are typically transferred into the customer 40 virtual wallet 90. The transfer of funds may be from a debit account 210 with an established financial service provider 190 such as a bank, building society or other or from a credit facility offered by a provider 190.

This may be followed by a second authentication procedure typically following a secondary vetting procedure by the system administrator 160 as well as a more thorough check of the information provided which may require confirmation from parties independent of the system administrator 160. Preferably, at this stage, the preferred source for the transfer may be nominated by the customer 40 but not processed.

Figure 9:
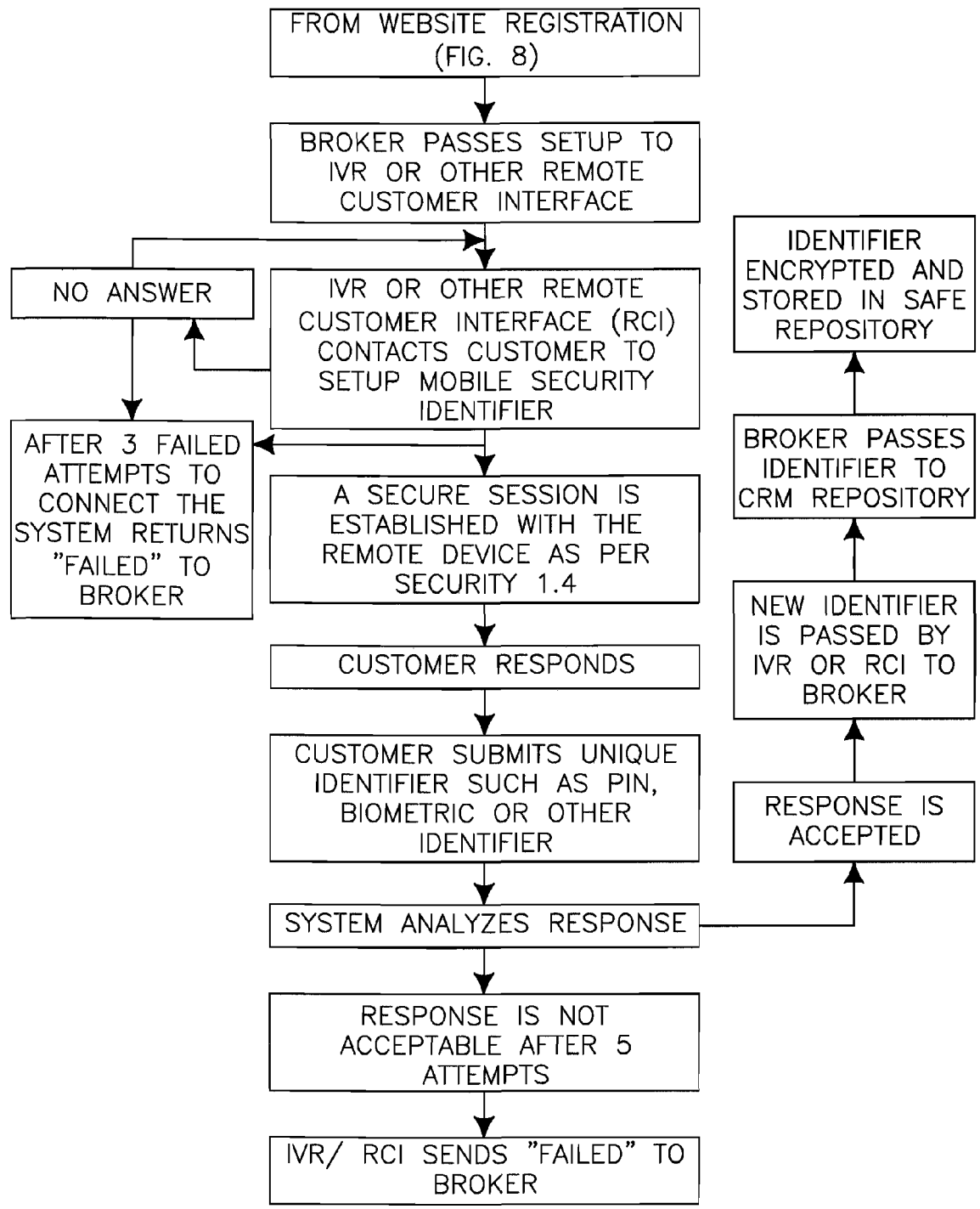
FIG. 9 is a flowchart outlining a customer authentication process of a remote payment system incorporating a preferred embodiment of the present invention.

Once the customer 40 advises the system 100 of the preferred source for the transfer, the customer 40 may then be asked to follow an authentication procedure to authenticate their identity, validity of access to the system 100 and to the source account 210 for the transfer or similar. A preferred implementation of the authentication process is illustrated in FIG. 9.

The authentication procedure may include the data processing architecture 110 creating an authentication prompt and communicating the authentication to the at least one communication means 130 associated with the data processing architecture 110.

The validation and authorisation for the payment 200 is performed using the authentication system 20 outlined earlier. Again, once authentication is granted or declined, a suitable message advising the customer 40 of the outcome of the authentication process will preferably be generated by the data processing architecture 110 and forwarded to the customer 40 preferred remote communications device 30 via the at least one communication means 130 associated with the data processing architecture 110. A plurality of options may also be offered to the customer 40, either instead of, before or after the authentication, as outlined above.

If the authentication process is successful, the payment 200 is recorded by the system 100 and the customer 40 virtual wallet 90 updated to account for the payment 200 and to accurately reflect the funds available to the customer 40 through the system 100.

A post-start-up funds transfer to top up their virtual wallet 90 or balance enquiry or other transaction types will also typically be possible. Each transaction will typically be subject to the authentication process including contacting the customer 40 by the system 100 and the request for validating information. Multiple transaction options may however be provided to the customer 40 within the one secure authentication session.

Figure 10:
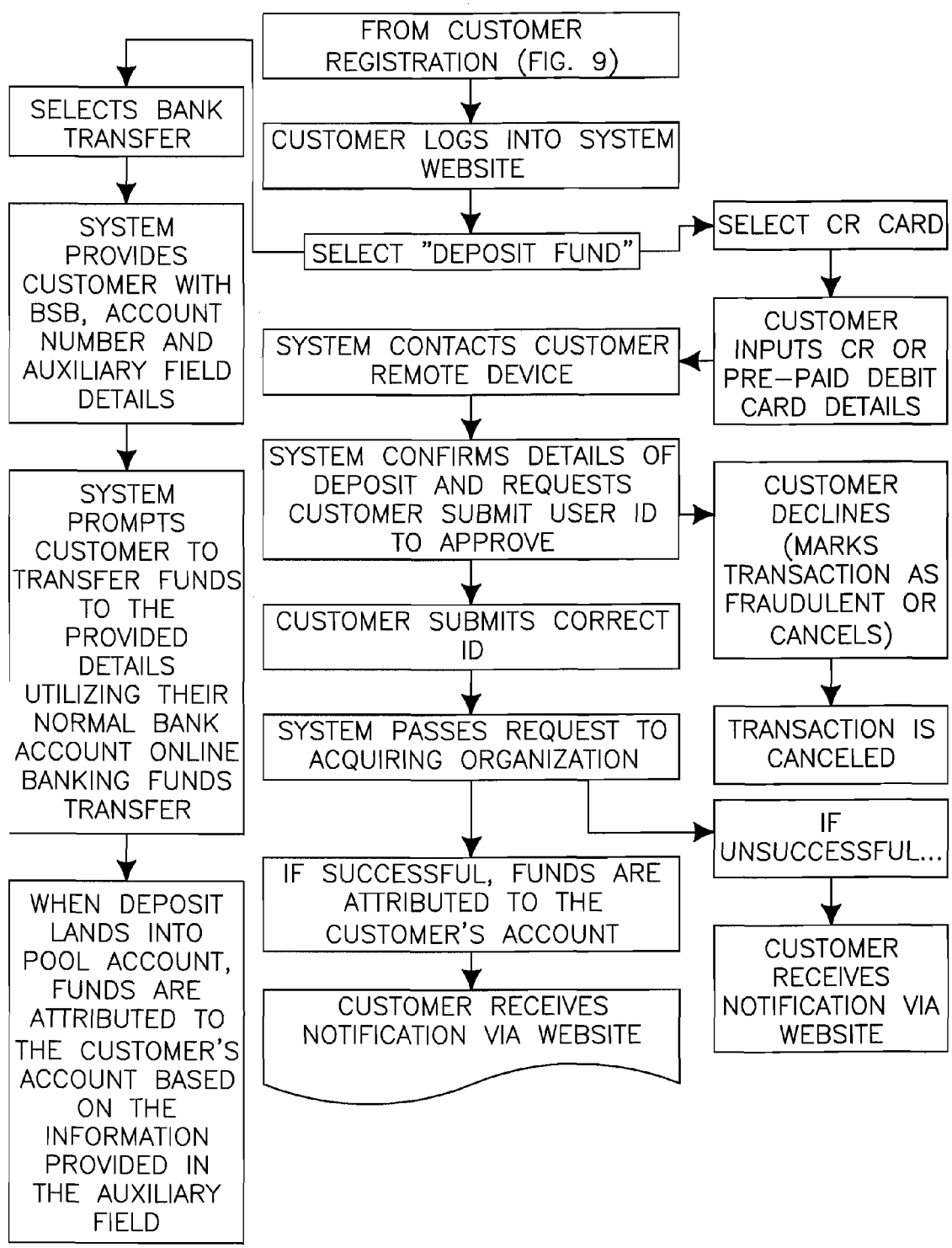
FIG. 10 is a flowchart outlining a first deposit process of a remote payment system incorporating a preferred embodiment of the present invention.

Once the customer 40 identity has been validated, the customer 40 will typically be prompted to transfer start-up funds into their virtual wallet 90 for use under the system 110. In this case, the customer 40 will typically follow a first deposit procedure, a preferred implementation of which is illustrated in FIG. 10. The funds transfer may differ depending upon whether the customer 40 is using a debit or a credit facility. If a credit facility is used, the system 100 may function on a real-time basis, drawing down the credit card information and processing the credit card payment on demand whereas if a debit facility is used, the customer 40 may transfer funds into their virtual wallet 90 for use immediately or at a later time.

Following the prompt to transfer start-up funds, the system 100 still using the IVR component 28 and generally on the same contact as the authentication contact, will request that the customer 40 designate the amount to be transferred. The system may then process this request with the customer's 40 nominated financial institution 190 and account and issue a successful/unsuccessful notification to the customer 40. The customer 40 contact with the IVR component 28 may be terminated at that stage or the system 100 may question whether any further activity is to be undertaken by the customer 40. If the transfer is successful, the payment 200 is recorded by the system 100 and the customer's 40 virtual wallet 90 updated to account for the payment 200 and to accurately reflect the funds available to the customer 40 through the system 100.

Typically, for balancing the processing load on the system 100, the customer 40 transactions and updates to the respective virtual wallets 90 may be conducted in real-time but the updating of transfer of funds to the business members 60 of the system 100 may occur in lull periods in the system 100. The update of funds transfers to business members 60 may occur in bulk "squirts" wherein a single amount may be transferred to a business member 60 with the appropriate information to identify the customer payers 40. The timing of the lull periods may occur at a particular time each period, typically each day, or the system 100 may be self-monitoring to process transfers to businesses 60 when the processing of customer 40 transfers drops.

Depending upon the outcome of the first deposit procedure, the registry profile 80 and more particularly, the customer's 40 virtual wallet 90 may be "loaded" with an entry indicating the value of funds transferred from the source account 210 into the customer's 40 virtual wallet 90 which can then be used by the customer 40 to make payments 140 to business members 60 of the system 100 at any time.

Figure 11A:
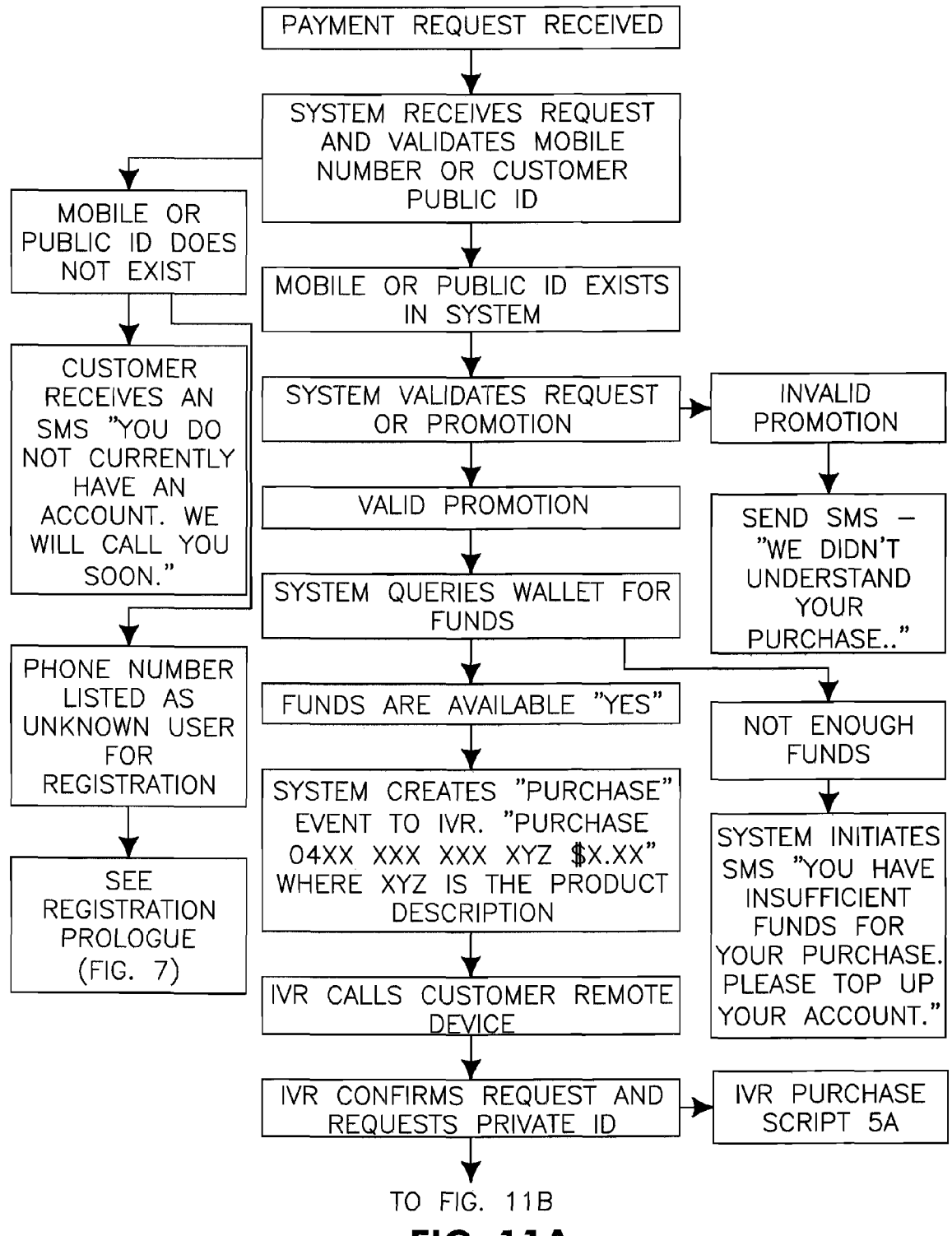
FIG. 11 is a flowchart outlining a purchase process of a remote payment system incorporating a preferred embodiment of the present invention.
Figure 11B:
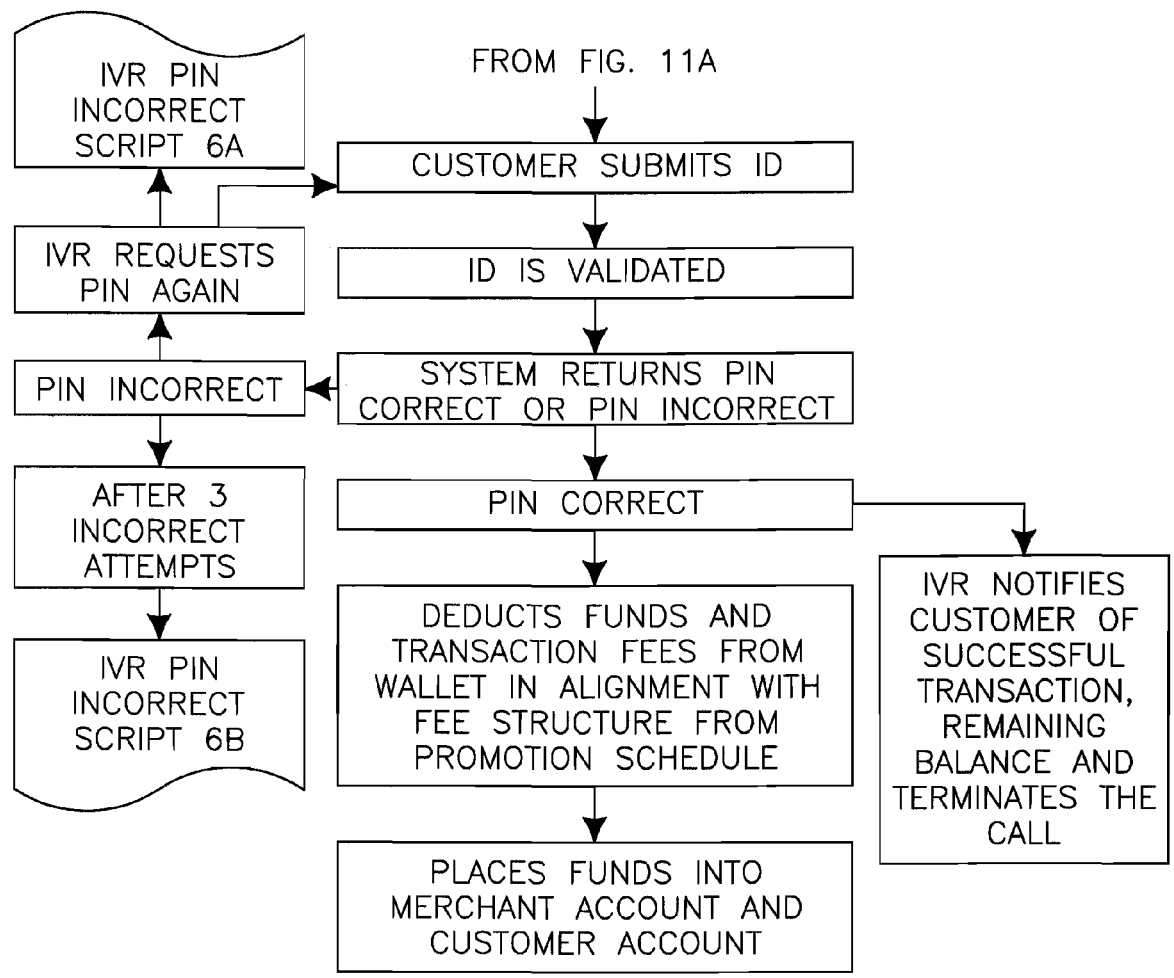

A preferred implementation of the payment process is illustrated in FIG. 11. In order to make a payment 140 using the system, a payment request 150 will typically be generated through an interface to the system 100 by a business member 60 (a "pull" operation), a customer 40 (a "push" operation) or by other means and the payment request 150 will preferably be tagged and associated with a particular customer's 40 registry profile 80. The customer 40 will also be notified of the pending payment request 150 either by the business member 60 directly or by the system 100 itself.

Once the payment request 150 has been generated, the customer 40 indicates that payment 140 using the system 100 is to be performed, normally by contact with the communication means 130 associated with the data processing architecture 120. The data processing architecture 120 then typically verifies the details of the payment request 150 and may also verify the customer 40 identity and the availability of funds in the customer virtual wallet 90 and then forwards a prompt to the communications means 130 to contact the customer 40 for the validation or authorisation for the payment 140.

Again, the validation and authorisation for the payment 140 is performed using the authorisation system 20 outlined earlier. Once authentication is granted or declined, a suitable message advising the customer 40 of the outcome of the authentication process will preferably be generated by the data processing architecture 120 and forwarded to the customer's preferred remote communications device 30 via the at least one communication means 130 associated with the data processing architecture 120.

If the authentication process is successful, the payment 140 is recorded by the system 100 and the customer 40 virtual wallet 90 updated to account for the payment 140 and to accurately reflect the funds available to the customer 40 through the system 100. Additional options may be presented to the client whilst in the secure authorisation session.

Figure 12A:
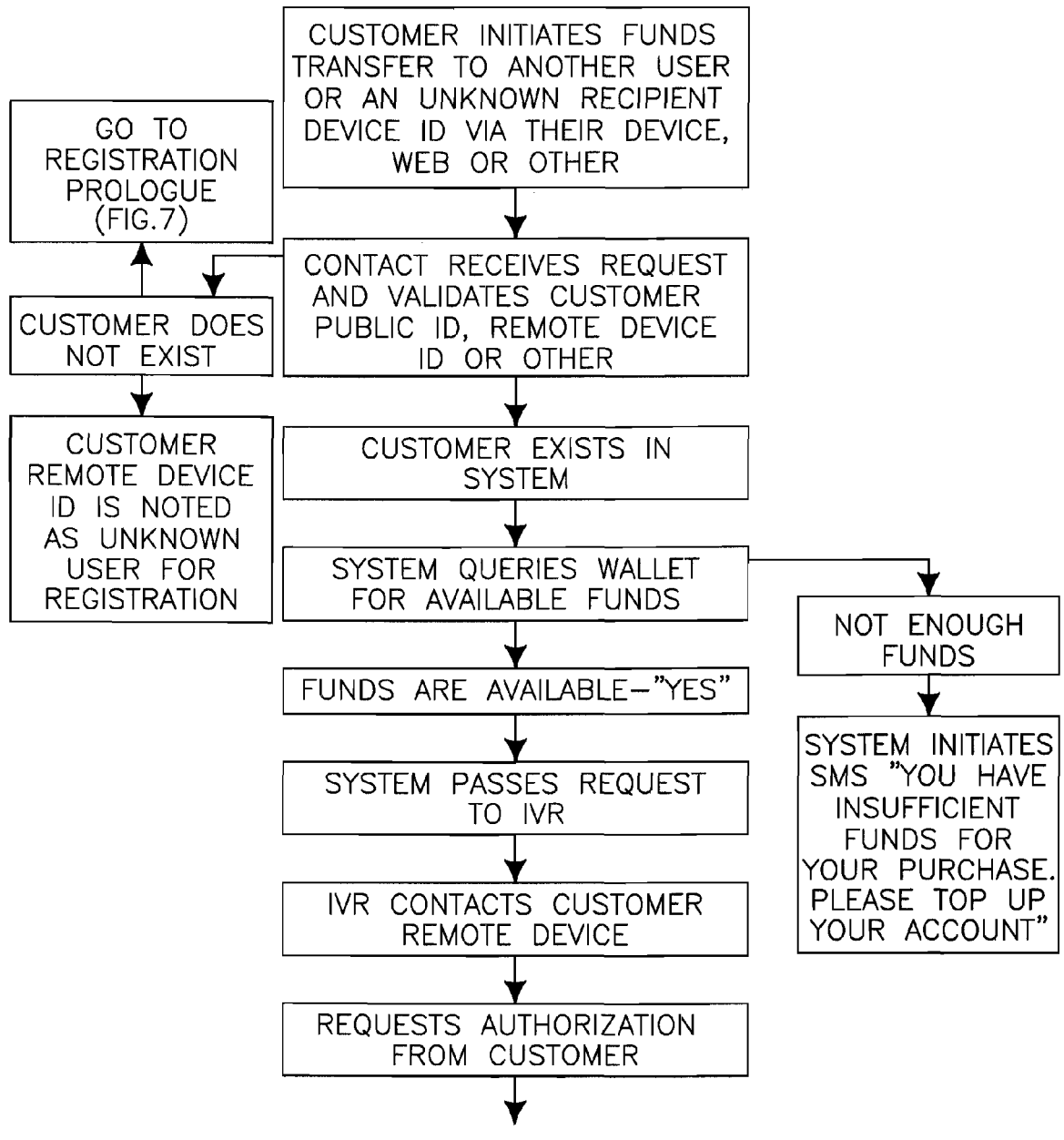
FIG. 12 is a flowchart outlining a funds transfer process of a remote payment system incorporating a preferred embodiment of the present invention.
Figure 12B:
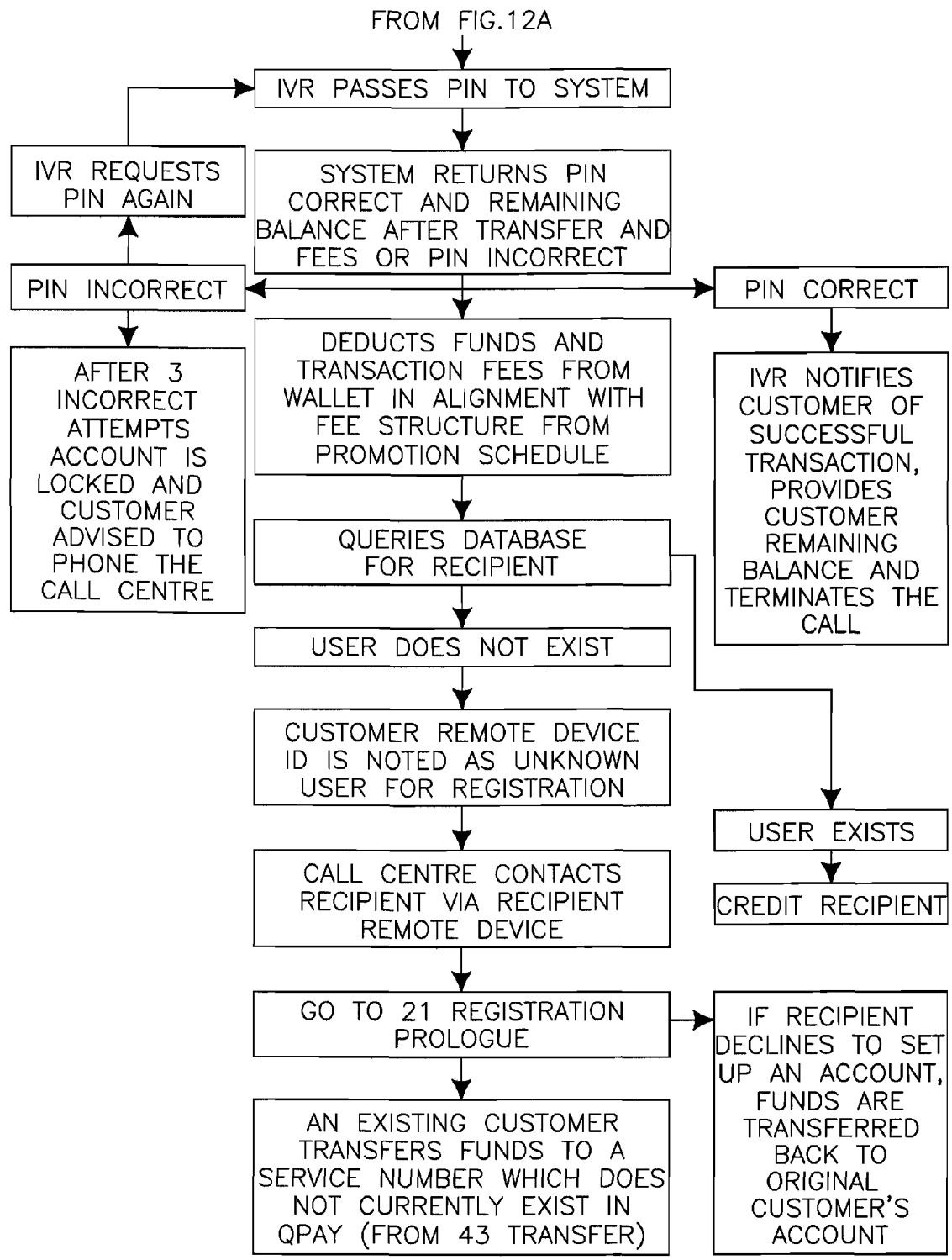
Figure 13:
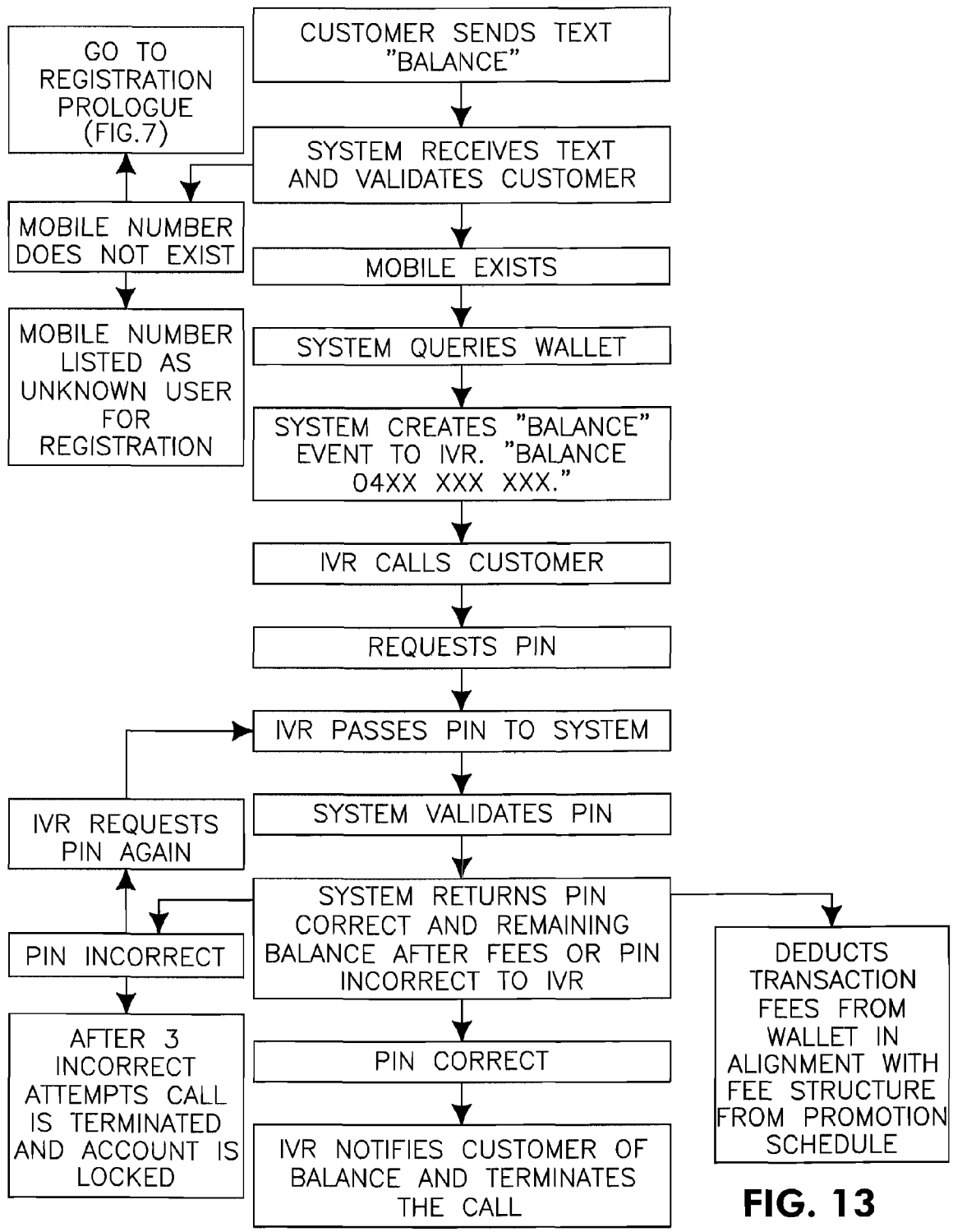
FIG. 13 is a flowchart outlining a balance enquiry process of a remote payment system incorporating a preferred embodiment of the present invention.

A post-start-up funds transfer to top up their virtual wallet 90 (a preferred implementation of this process is illustrated in FIG. 12) or balance enquiry (a preferred implementation of this process is illustrated in FIG. 13) or other transaction types will also typically be possible. Each transaction will typically be subject to the authentication process using authorisation system 20 including contacting the customer by the system 100 and the request for validating information.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more combinations.

The foregoing discussion is considered as illustrative only of the principles of the invention. Furthermore, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A transaction authorisation system for allowing a customer to authorise transactions relating to at least one customer account associated with an institution, the account including account identification data held at the institution the system comprising:
   a data storage for enabling access to stored data, the stored data including:
      (a) identification data associated with the customer;
      (b) identification data associated with a remote communication device (RCD) of the customer; and
      (c) security identifier data which is known only to the institution and the authorisation system, and differs from the account identification data held at the institution, the security identifier data associating the at least one customer account with either one or both of the identification data (a) and the identification data (b);

means for communicating with the customer via the RCD to authorise a transaction on the at least one customer account or to indicate a transaction on the at least one customer account is fraudulent, the RCD being identified via the identification data stored in the data storage;

means for identifying the customer using the identification data (a) stored in the data storage, identifying the RCD using the identification data (b) stored in the data storage, and determining if the transaction is authorised by the customer or if the transaction has been indicated as being fraudulent by the customer, and if said transaction is fraudulent, to determine the type of fraud associated with the fraudulent transaction; and means for communication with the data processing architecture for receiving an authorisation request in relation to the transaction and for communicating an indication to the institution of: (i) whether or not the transaction is authorised by the customer, and (ii) whether the transaction is indicated as being fraudulent by the customer, and if so, the type of fraud determined, wherein the authorisation request received and the indication provided to the institution are identified to each other using the security identifier data.

2. The transaction authorisation system of claim 1, wherein the type of fraud includes at least one of a Man-in-the-Middle attack or Identity Theft.

3. The transaction authorisation system of claim 1, wherein the means for receiving an authorisation request is arranged to provide information to the institution in order to maintain contact with the fraudulent party.

4. A method for allowing a customer to authorise transactions relating to at least one customer account held at an institution, the account including account identification data held at the institution, the method comprising the steps of:
  (a) an authorisation server receiving an authorisation request from the institution in relation to a transaction on the at least one customer account;
  (b) the authorisation server communicating with the customer via a remote communication device (RCD) of the customer to authorise the transaction;
  (c) the authorisation server identifying the customer using identification data associated with the customer to which the authorisation server has access;
  (d) the authorisation server identifying the RCD using stored identification data associated with the RCD to which the authorisation server has access;
  (e) the authorisation server determining if the transaction is authorised by the customer or if the transaction is indicated as fraudulent by the customer, and if said transaction is fraudulent, determining the type of fraud associated with the fraudulent transaction;
  (f) the authorisation server communicating an indication to the institution of (i) whether or not the transaction is authorised by the customer, and (ii) whether the transaction is indicated as being fraudulent by the customer, and if so, the type of fraud determined,
  wherein the authorisation request received by the authorisation server and the indication provided to the institution are identified to the institution and the authentication server using the security identifier data for associating the at least one customer account with one or both of the stored identification data associated with the customer and the stored identification data associated with the RCD, wherein the security identifier data is known only to the authorisation server and the institution, and wherein the security identifier data differs from the account identification data.

5. The transaction authorisation method of claim 4, wherein the type of fraud includes at least one of a Man-in-the-Middle attack or Identity Theft.

6. The transaction authorisation method of claim 4, wherein the authorisation server provides information to the institution in order to maintain contact with the fraudulent party.

7. The transaction authorisation system of claim 1, wherein the means for communicating includes an interactive voice response (IVR) system arranged to provide the customer with a plurality of alternative feedback options.

8. The transaction authorisation system of claim 7, wherein the feedback options include at least one of: authorising the transaction, canceling the transaction, indicating the transaction as fraudulent, indicating the transaction details are incorrect, or indicating the customer did not initiate the transaction.

9. The transaction authorisation system of claim 7, wherein the IVR system is arranged to provide the customer with additional feedback options upon the customer selecting at least one of the alternative feedback options.

10. The transaction authorisation system of claim 9, wherein the additional feedback options are provided to the customer upon the customer authorising the transaction.

11. The transaction authorisation system of claim 10, wherein at least one of the additional feedback options includes the customer being identified with additional security identifier data.

12. The transaction authorisation system of claim 1, wherein the transaction authorisation system is used in a remote payment system for permitting payments for goods and services remotely in a secure manner with members of the remote payment system.

13. The transaction authorisation method of claim 4, wherein the authorisation server communicating with the customer via a remote communication device of the customer includes use of an interactive voice response (IVR) system which provides the customer with a plurality of alternative feedback options.

14. The transaction authorisation method of claim 13, wherein the feedback options include at least one of: authorising the transaction, canceling the transaction, indicating the transaction as fraudulent, indicating the transaction details are incorrect, or indicating the customer did not initiate the transaction.

15. The transaction authorisation method of claim 13, wherein the IVR system provides the customer with additional feedback options upon the customer selecting at least one of the alternative feedback options.

16. The transaction authorisation method of claim 15, wherein the additional feedback options are provided to the customer upon the customer authorising the transaction.

17. The transaction authorisation method of claim 16, wherein at least one of the additional feedback options includes the customer being identified with additional security identifier data.

18. The transaction authorisation method of claim 4, wherein the authorised transactions include authenticating credit card transactions.

* * * * *